(12) United States Patent
Yue et al.

(10) Patent No.: US 11,822,176 B2
(45) Date of Patent: Nov. 21, 2023

(54) DISPLAY PANEL AND DISPLAY DEVICE

(71) Applicant: BOE TECHNOLOGY GROUP CO., LTD., Beijing (CN)

(72) Inventors: Yang Yue, Beijing (CN); Qian Wang, Beijing (CN); Tong Yang, Beijing (CN); Liwen Dong, Beijing (CN); Shi Shu, Beijing (CN); Yong Yu, Beijing (CN); Qi Yao, Beijing (CN); Haitao Huang, Beijing (CN); Xiang Li, Beijing (CN); Chuanxiang Xu, Beijing (CN); Jifeng Tan, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 360 days.

(21) Appl. No.: 17/309,726

(22) PCT Filed: Dec. 29, 2020

(86) PCT No.: PCT/CN2020/140625
§ 371 (c)(1),
(2) Date: Jun. 16, 2021

(87) PCT Pub. No.: WO2021/174976
PCT Pub. Date: Sep. 10, 2021

(65) Prior Publication Data
US 2022/0308388 A1    Sep. 29, 2022

(51) Int. Cl.
*G02F 1/1335* (2006.01)
(52) U.S. Cl.
CPC .. *G02F 1/133512* (2013.01); *G02F 1/133514* (2013.01); *G02F 1/133553* (2013.01)
(58) Field of Classification Search
CPC ......... G02F 1/133553; G02F 1/133514; G02F 1/133512; G02F 2203/30; G02F 1/133615;

(Continued)

(56) References Cited

U.S. PATENT DOCUMENTS

2010/0253660 A1* 10/2010 Hashimoto ............... G01J 1/42
345/207
2020/0333663 A1* 10/2020 Li ..................... G02F 1/133528

FOREIGN PATENT DOCUMENTS

CN          1316064 A      10/2001
CN        101859038 A      10/2010
(Continued)

OTHER PUBLICATIONS

First Office Action dated Feb. 3, 2021 for application No. CN202010152872.5 with English translation attached.
(Continued)

*Primary Examiner* — Hoan C Nguyen
(74) *Attorney, Agent, or Firm* — Nath, Goldberg & Meyer; Joshua B. Goldberg

(57) ABSTRACT

There is provided a display panel including: a light guide structure layer having a light exiting side and configured to enable internal light to be emitted from a preset position; a display structure layer on the light exiting side and including a light adjusting structure, a black matrix and a reflection matrix positioned on a side, away from the light guide structure layer, of the light adjusting structure, the light adjusting structure is configured to control light emitted from the preset position to enter an area where the black matrix is positioned and/or an area where the reflection matrix is positioned; a light absorption structure layer on a side of the light adjusting structure away from the black matrix and configured to absorb light reflected by the black matrix and allow light reflected by the reflection matrix to pass through. A display device is further provided.

14 Claims, 16 Drawing Sheets

(58) Field of Classification Search
CPC ........... G02F 2203/02; G02F 1/133616; G02F 1/133611; G02F 1/133565; G02F 1/1343; G02F 1/133606; G02F 1/13362; G02F 1/1337; G02F 1/1335; G02F 1/13394; G02F 1/133528; G02F 1/1333; G02F 1/136209; G02F 1/13398; G02F 1/133368; G02B 6/0056; G02B 6/0066; G02B 6/005; G02B 6/0055; G09G 3/3413; G09G 3/3406; G09G 3/3607
See application file for complete search history.

(56) References Cited

FOREIGN PATENT DOCUMENTS

| | | | | | |
|---|---|---|---|---|---|
| CN | 104216188 | A | | 12/2014 | |
| CN | 108717243 | A | * | 10/2018 | ....... G02F 1/133606 |
| CN | 110244492 | A | * | 9/2019 | ......... G02B 19/0047 |
| CN | 110262119 | A | | 9/2019 | |
| CN | 110673388 | A | | 1/2020 | |
| CN | 111045255 | A | * | 4/2020 | ....... G02F 1/133512 |
| CN | 111208675 | A | | 5/2020 | |
| CN | 111240091 | A | * | 6/2020 | ............. G02B 6/005 |
| CN | 212255942 | U | * | 12/2020 | ............. G02B 6/005 |
| JP | 2003029295 | A | | 1/2003 | |

OTHER PUBLICATIONS

Second Office Action dated Sep. 23, 2021 for application No. CN202010152872.5 with English translation attached.

* cited by examiner

L0 light path: ----------
L255 light path: --------

DISPLAY PANEL AND DISPLAY DEVICE

This is a National Phase Application filed under 35 U.S.C. 371 as a national stage of PCT/CN2020/140625, filed Dec. 29, 2020, an application claiming the benefit of Chinese Application No. 202010152872.5, filed Mar. 6, 2020, the content of each of which is hereby incorporated by reference in its entirety.

TECHNICAL FIELD

The present disclosure relates to the field of display technology, and in particular, to a display panel and a display device.

BACKGROUND

Liquid Crystal Displays (LCDs) have a series of advantages such as high color gamut, good picture quality, thinness, small volume, light weight, fast response, low power consumption, no radiation, and relatively low manufacturing cost, and have been widely used in electronic products such as tablet computers, televisions, mobile phones, and vehicle-mounted displays. With the maturity of liquid crystal display technology, application scenarios such as transparent display, reflective display, head-mounted display, directional display, and the like have been expanded. The transparent display is an important branch of display technology, and means that an image is displayed in a transparent state, and a viewer can see not only the image in a display device but also a scene behind the display device. The transparent display device can be used for vehicle windshields, transparent refrigerator doors, mirrors and the like, and has wide application prospect.

However, the conventional transparent display device has the problem of serious light leakage in dark state, and the contrast of the transparent display device is seriously influenced.

SUMMARY

The present disclosure is directed to at least one of the technical problems in the related art, and provides a display panel, a method for manufacturing a display panel, and a display device.

In a first aspect, an embodiment of the present disclosure provides a display panel, including:
 a light guide structure layer having a light exiting side and configured to enable internal light to be emitted from a preset position of the light exiting side;
 a display structure layer arranged on the light exiting side of the light guide structure layer and including a light adjusting structure, a black matrix and a reflection matrix, the black matrix and the reflection matrix are positioned on a side of the light adjusting structure away from the light guide structure layer, and the light adjusting structure is configured to control light emitted from the preset position to be incident into an area where the black matrix is positioned and/or an area where the reflection matrix is positioned;
 a light absorption structure layer positioned on a side of the light adjusting structure away from the black matrix, and configured to absorb light reflected by a surface of the black matrix and allow light reflected by a surface of the reflection matrix to pass through.

In some implementations, the display structure layer has a display area including a plurality of sub-pixel areas;
 the light guide structure layer includes a plurality of light extracting openings which are positioned at preset positions and correspond to the sub-pixel areas one by one;
 the black matrix includes a plurality of light blocking elements which correspond to the sub-pixel areas one by one;
 the reflection matrix includes a plurality of light reflecting elements which correspond to the sub-pixel areas one by one;
 the light absorption structure layer includes a plurality of light absorption elements which correspond to the sub-pixel areas one by one;
 the light extracting openings, the light blocking elements, the light reflecting elements and the light absorption elements are all positioned in the corresponding sub-pixel areas.

In some implementations, the light blocking element includes: a first light blocking pattern and a second light blocking pattern;
 the second light blocking pattern is located on a side of the first light blocking pattern proximal to the light adjusting structure, a surface of the second light blocking pattern away from the first light blocking pattern is a first inclined surface, a plane where the first inclined surface is located is intersected with a plane where the first light blocking pattern is located, and the first inclined surface faces the light extracting opening located in the sub-pixel area where the light blocking element is located.

In some implementations, in each of the sub-pixel areas, the light reflecting element is further away from the light extracting opening with respect to the second light blocking pattern;
 an orthographic projection of the second light blocking pattern on the plane where the first light blocking pattern is located is in contact with an orthographic projection of the light reflecting element on the plane where the first light blocking pattern is located.

In some implementations, in each of the sub-pixel areas, the light reflecting element is located at a side of the first light blocking pattern proximal to the light adjusting structure;
 the light reflecting element and the second light blocking pattern are arranged on a surface, proximal to the light adjusting structure, of the first light blocking pattern side by side and are in contact with each other.

In some implementations, the light reflecting element includes: a body and a reflective layer, where a surface, away from the first light blocking pattern, of the body is a second inclined surface, a plane where the second inclined surface is located is intersected with the plane where the first light blocking pattern is located, the second inclined surface faces the light extracting opening located in the sub-pixel area where the light reflecting element is located, and the reflective layer is arranged on the second inclined surface.

In some implementations, the body, the first light blocking pattern and the second light blocking pattern are integrally formed as a single piece.

In some implementations, the light adjusting structure includes a liquid crystal layer, and the display structure layer further includes: a base substrate, a first electrode layer and a second electrode layer;
 the first electrode layer is positioned on a side, proximal to the liquid crystal layer, of the base substrate, the black matrix and the reflection matrix are positioned on a side, proximal to the liquid crystal layer, of the first electrode layer, and the second electrode layer is positioned on a side, away from the black matrix, of the liquid crystal layer;

the light absorption structure layer is positioned between the second electrode layer and the liquid crystal layer.

In some implementations, the display structure layer further includes: a color filter matrix disposed on a side of the light adjusting structure away from the reflection matrix, and the color filter matrix is configured to filter light emitted from the preset position and/or to filter light reflected by the surface of the reflection matrix.

In some implementations, a protective layer is disposed between the second electrode layer and the light absorption structure layer, and the protective layer is in contact with the light absorption structure layer, and the protective layer is configured to prevent material residue from occurring in a non-pattern area during a process of forming a pattern of the light absorption structure layer through a patterning process.

In some implementations, a material of the light absorption structure layer includes carbon;

a material of the protective layer includes silicon oxide.

In some implementations, a scattering layer is disposed on a side of the light guide structure layer away from the light adjusting structure.

In some implementations, a side of the scattering layer away from the light guide structure layer is provided with a protective layer.

In a second aspect, an embodiment of the present disclosure provides a method for manufacturing a display panel, including:

forming a light guide structure layer having a light exiting side, and the light guide structure is configured to enable internal light to be emitted from a preset position of the light exiting side;

forming a display structure layer, where the display structure layer is arranged on the light exiting side of the light guide structure layer and includes a light adjusting structure, a black matrix and a reflection matrix, the black matrix and the reflection matrix are positioned on a side, away from the light guide structure layer, of the light adjusting structure, and the light adjusting structure is configured to control light emitted from the preset position to be incident into an area where the black matrix is located and/or an area where the reflection matrix is located; and forming a light absorption structure layer, where the light absorption structure layer is positioned on a side of the light adjusting structure away from the black matrix, and the light absorption structure layer is configured to absorb light reflected by a surface of the black matrix and allow light reflected by a reflecting surface of the reflection matrix to pass through.

In some implementations, the display structure layer has a display area including a plurality of sub-pixel areas;

the light guide structure layer includes a plurality of light extracting openings which are positioned at preset positions and correspond to the sub-pixel areas one by one;

the black matrix includes a plurality of light blocking elements which correspond to the sub-pixel areas one by one;

the reflection matrix includes a plurality of light reflecting elements which correspond to the sub-pixel areas one by one;

the light absorption structure layer includes a plurality of light absorption elements which correspond to the sub-pixel areas one by one;

the light extracting openings, the light blocking elements, the light reflecting elements and the light absorption elements are all positioned in the corresponding sub-pixel areas.

In some implementations, the forming the display structure layer includes:

forming a light blocking material film on a side of a base substrate;

patterning the light blocking material film to form a first light blocking pattern and a second light blocking pattern in each sub-pixel area, where the second light blocking pattern is positioned on a side, away from the base substrate, of the first light blocking pattern, a surface, away from the first light blocking pattern, of the second light blocking pattern is a first inclined surface, a plane where the first inclined surface is positioned is intersected with a plane where the first light blocking pattern is positioned, and the first light blocking pattern and the second light blocking pattern which are positioned in a same one of the sub-pixel areas form the light blocking element; and forming the light reflecting element on a side of the first light blocking pattern away from the base substrate.

In some implementations, the forming the display structure layer includes:

forming a light blocking material film on a side of a base substrate;

patterning the light blocking material film to form a first light blocking pattern, a second light blocking pattern and a body in each sub-pixel area, where the second light blocking pattern and the body are positioned on a side, away from the base substrate, of the first light blocking pattern, a surface, away from the first light blocking pattern, of the second light blocking pattern is a first inclined surface, a surface, away from the first light blocking pattern, of the body is a second inclined surface, a plane where the first inclined surface is positioned and a plane where the second inclined surface is positioned are intersected with a plane where the first light blocking pattern is positioned, and the first light blocking pattern and the second light blocking pattern which are positioned in a same one of the sub-pixel areas form the light blocking element; and forming a reflective layer on the second inclined surface, where the body and the reflective layer positioned in a same one of the sub-pixel areas form the reflecting element.

In some implementations, the forming the display structure layer and the forming the light absorption structure layer include:

forming a first electrode layer on the base substrate;

forming the black matrix and the reflection matrix on a side of the first electrode layer away from the base substrate, so as to obtain a first substrate;

forming a second electrode layer on the light exiting side of the light guide structure layer;

forming the light absorption structure layer on a side of the second electrode layer away from the light guide structure layer, so as to obtain a second substrate; and filling a liquid crystal layer between the first substrate and the second substrate, and aligning and assembling the first substrate and the second substrate into a cell.

In some implementations, the method further includes:

forming a scattering layer on a side of the light guide structure layer away from the light exiting side; and forming a protective layer on a side of the scattering layer away from the light guide structure layer.

In a third aspect, an embodiment of the present disclosure further provides a display device, including: a collimated light source and the display panel in the first aspect, where a light outlet of the collimated light source is opposite to a light inlet of the light guide structure layer.

DESCRIPTION OF DRAWINGS

FIG. 3b is a schematic diagram of light paths corresponding to gray scales L0 and L255 in FIG. 3a;

FIG. 3c is a bottom view of a light reflecting element and a light blocking element of FIG. 3a;

FIG. 6b is a schematic diagram illustrating a light path corresponding to a gray scale L0 in FIG. 6a;

FIG. 6c is a bottom view of a light reflecting element and a light blocking element of FIG. 6a;

FIG. 7b is a bottom view of a light reflecting element and a light blocking element of FIG. 7a;

DESCRIPTION OF EMBODIMENTS

In order to make those skilled in the art better understand the technical solutions of the present disclosure, a display panel, a method for manufacturing a display panel, and a display device provided in the present disclosure are described in detail below with reference to the accompanying drawings.

Figure 1:
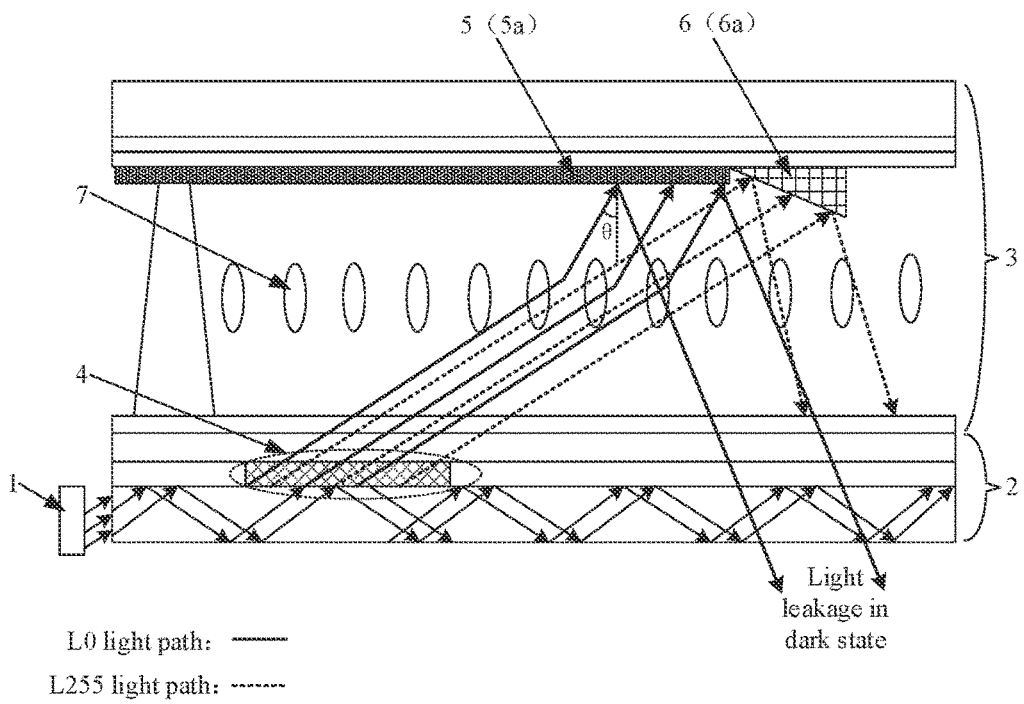
FIG. 1 is a schematic cross-sectional view of a transparent display device according to the related art.

FIG. 1 is a schematic cross-sectional view of a transparent display device according to the related art, and as shown in FIG. 1, the transparent display device includes a collimated light source 1, a light guide structure layer 2, and a display structure layer 3, a light outlet of the collimated light source 1 is right opposite to a light inlet of the light guide structure layer 2, and the display structure layer 3 is located on a light exiting side of the light guide structure layer 2.

A light extracting opening 4 is arranged at a preset position of the light exiting side of the light guide structure layer 2, so that light emitted to the light extracting opening 4 in the light guide structure layer 2 can exit from the light extracting opening 4, and a purpose of light extraction is achieved. The display structure layer 3 includes a display area and a transparent area, where a plurality of sub-pixel areas are included in the display area 9a, and each sub-pixel area is provided with a light blocking element 5a, a light reflecting element 6a and the light extracting opening 4.

The collimated light source 1 is configured to provide collimated polarized light, which enters the light guide structure layer 2 at a predetermined first angle and can be transmitted in the light guide structure layer 2 by total reflection. When the polarized light enters the light extracting opening 4 on the light exiting side, the polarized light can exit at a second angle (the second angle is determined by the first angle, a refractive index of a light guide plate, and a refractive index of a light extraction pattern). It should be noted that the "angle" of the light referred to in the embodiment of the present disclosure refers to an angle between a propagation direction of the light and a direction perpendicular to the transparent display device (i.e., a vertical direction in the drawings).

Under a condition of not applying a driving electric field, the polarized light emitted from the light extracting opening 4 at the second angle directly emits to the reflecting surface of the light reflecting element 6a, is reflected by the reflecting surface, then passes through the light guide structure layer 2 again, and is emitted from a side of the light guide structure layer 2 opposite to the liquid crystal layer 7, so as to realize a display of a gray scale L255. Under a condition of applying a certain driving electric field, liquid crystal molecules in the liquid crystal layer 7 deflect to form a liquid crystal prism, the liquid crystal prism can deflect the polarized light emitted from the light extracting opening 4 at the second angle, so that a propagation direction of the polarized light is changed, a part of light is emitted to the light blocking element 5a, the quantity of light reaching the reflecting surface of the light reflecting element 6a is reduced, and the quantity of light which is reflected by the reflecting surface and finally exited from the side of the light guide structure layer 2 opposite to the liquid crystal layer 7 is reduced, namely, the brightness is reduced; by adjusting an intensity of the driving electric field, a deflection degree of light deflected by the liquid crystal prism can be controlled, so that the quantity of light which is incident on the reflecting surface of the reflecting element 6a can be controlled, namely, a control of display brightness of the sub-pixel area 901 is realized. In an ideal case, the intensity of the driving electric field is controlled so that all the light emitted from the light extracting opening 4 is emitted to the light blocking element 5a and absorbed by the light blocking element 5a, thereby realizing a display of a gray scale L0.

However, in practical applications, it is found that a surface of the light blocking element 5a may reflect light to a certain extent, especially has a relatively large reflectivity to the light having a relatively large incident angle, and the light reflected by the surface of the light blocking element 5a passes through the light guide structure layer 2 again and exits from the side of the light guide structure layer 2 opposite to the liquid crystal layer 7. Especially, when a display of a low gray scale is performed, a quantity of light emitted to the light blocking element 5a is relatively large, and the transparent display device has an obvious light leakage phenomenon in dark state, which seriously affects a contrast of the transparent display device.

In order to solve the above problems in the related art, embodiments of the present disclosure provide a display panel, a method for manufacturing a display panel, and a display device, which will be described in detail below with reference to the accompanying drawings.

Figure 2:
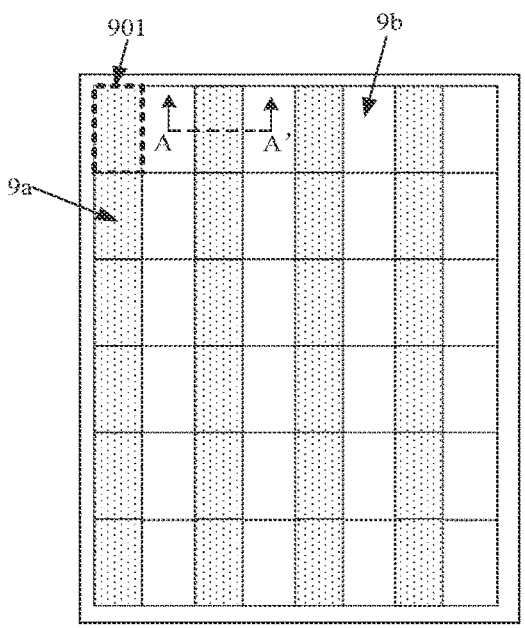
FIG. 2 is a top view of a display panel according to an embodiment of the present disclosure.
Figure 3A:
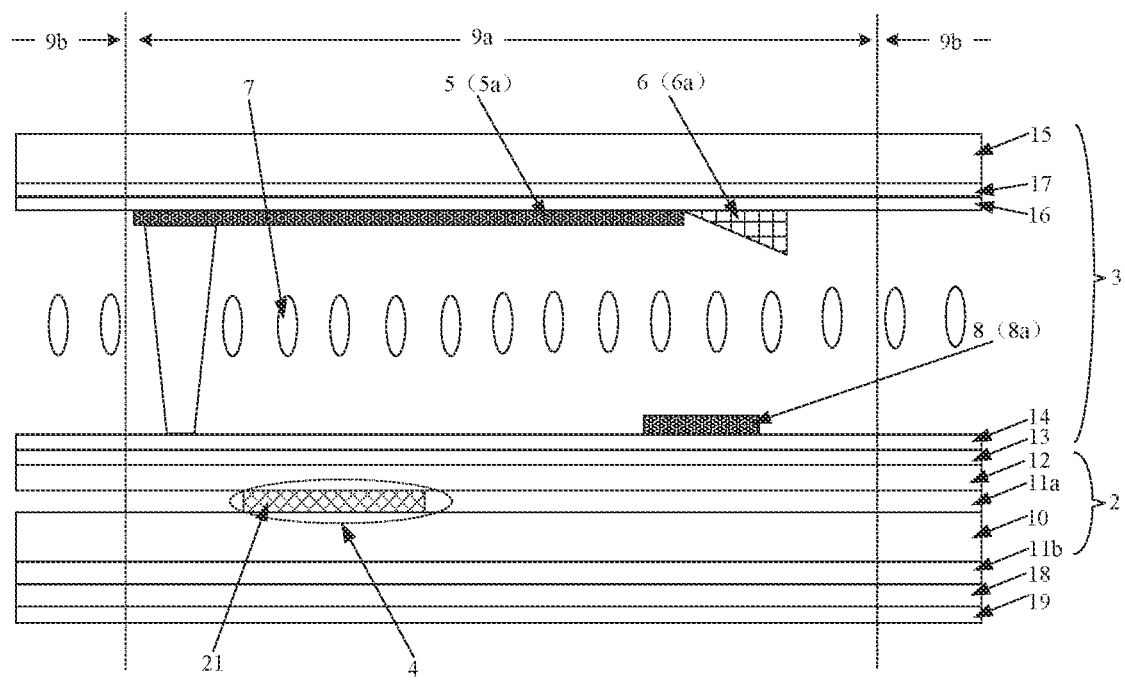
FIG. 3a is a schematic cross-sectional view taken along line A-A' of FIG. 2.
Figure 3B:
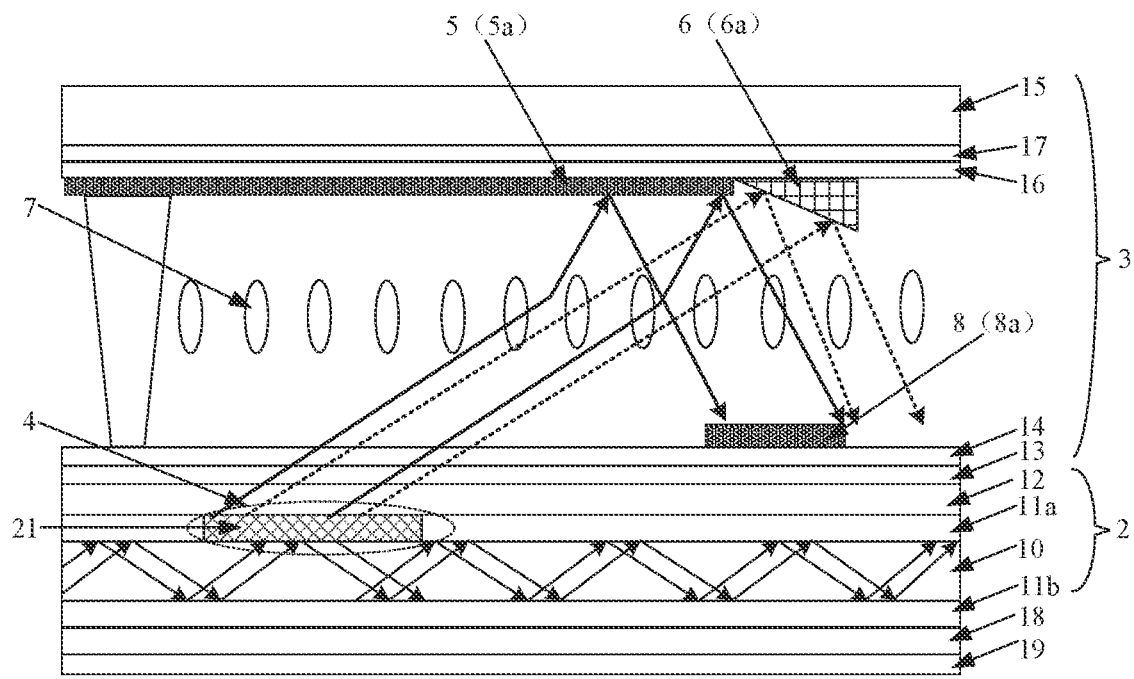
Figure 3C:
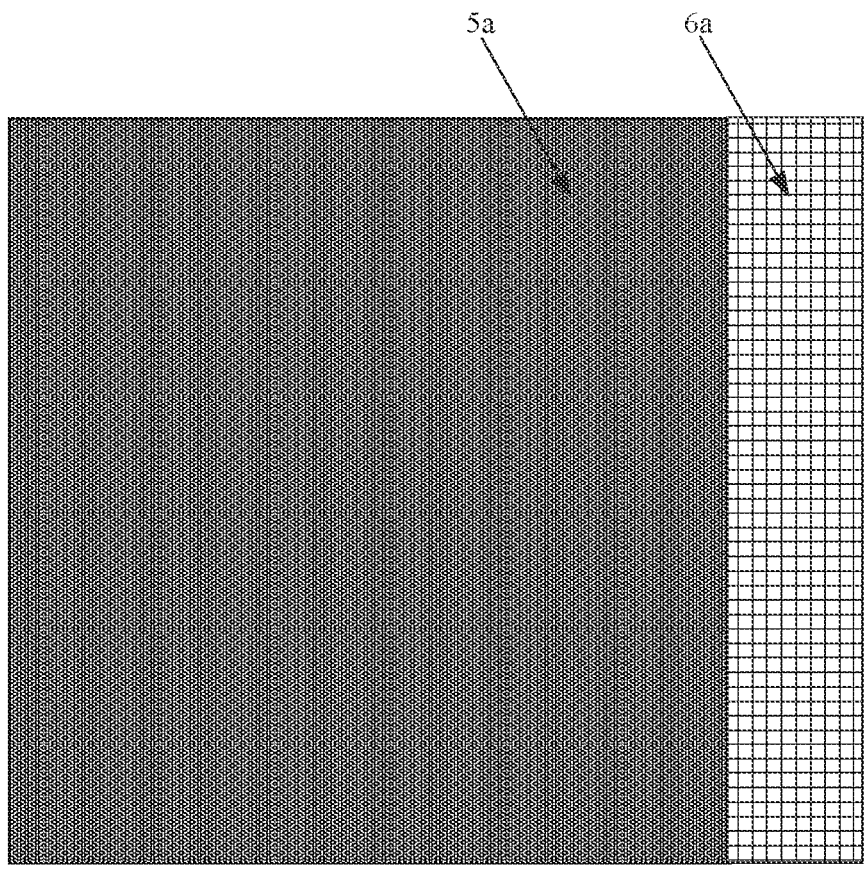

FIG. 2 is a top view of a display panel according to an embodiment of the present disclosure, FIG. 3a is a schematic cross-sectional view taken along line A-A' in FIG. 2, FIG. 3b is a schematic diagram of light paths corresponding to a gray scale L0 and a gray scale L255 in FIG. 3a, FIG. 3c is a bottom view of a light reflecting element and a light blocking element in FIG. 3a, and as shown in FIGS. 2 to 3c, the display panel includes: a light guide structure layer 2, a display structure layer 3 and a light absorption structure layer 8.

The light guide structure layer 2 has a light exiting side, and is configured to allow internal light to exit from a preset position of the light exiting side.

The display structure layer 3 is arranged on the light exiting side of the light guide structure layer 2, and includes a light adjusting structure, a black matrix 5 and a reflection matrix 6, where the black matrix 5 and the reflection matrix 6 are positioned on a side, away from the light guide structure layer 2, of the light adjusting structure, and the light adjusting structure is configured to control the light emitted from the preset position to enter an area where the black matrix 5 is positioned and/or an area where the reflection matrix 6 is positioned.

The light absorption structure layer 8 is located on a side of the light adjusting structure away from the black matrix 5, and is configured to absorb the light reflected by a surface of the black matrix 5 and allow the light reflected by a surface of the reflection matrix 6 to pass through.

In the embodiment of the present disclosure, an example of the light adjusting structure including a liquid crystal layer 7 is described. It should be understood by those skilled in the art that the light adjusting structure in the present disclosure may be any other structure capable of controlling a deflection angle of light, and examples are not limited herein one by one.

In some implementations, a material of the light absorption structure layer 8 is the same as a material of the black matrix 5.

In the embodiment of the present disclosure, the display structure layer 3 has a display area 9a and a transparent area 9b, where the display area 9a is configured for displaying a picture, and the transparent area 9b is configured for observing an object behind the display panel by a user, so as to implement transparent display.

In the embodiment of the present disclosure, the light absorption structure layer 8 is disposed on the side of the light adjusting structure away from the black matrix 5, so as to absorb the light reflected by the surface of the black matrix 5 and allow the light reflected by the surface of the reflection matrix 6 to pass through, thereby effectively avoiding the problem of light leakage in dark state caused by reflection of the black matrix 5 without affecting display, and thus effectively improving the contrast of the display device.

Figure 4:
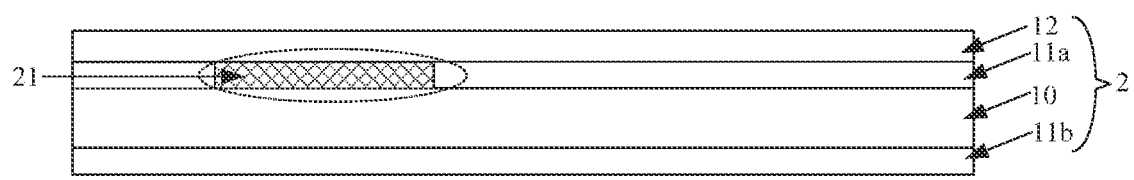
FIG. 4 is a schematic structural diagram of a light guide structure layer according to an embodiment of the present disclosure.
Figure 5:
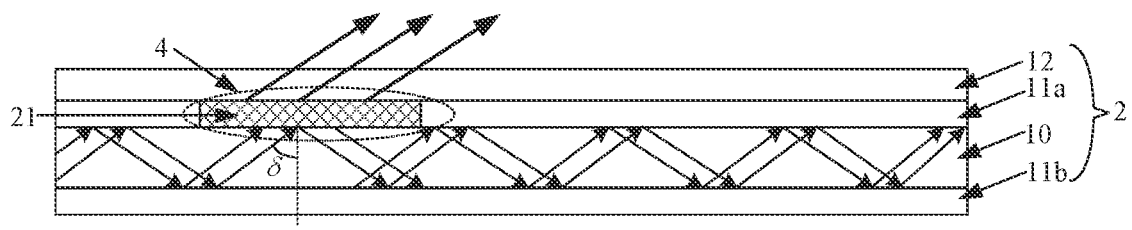
FIG. 5 is a schematic diagram showing light paths of partial light in FIG. 4.

FIG. 4 is a schematic structural view of a light guide structure layer in an embodiment of the present disclosure, and FIG. 5 is a schematic diagram of light paths of a part of light in FIG. 4, and as shown in FIGS. 4 and 5, the light guide structure layer 2 includes: a light guide plate 10, a first low refractive index material layer 11a, and a second low refractive index material layer 11b; the first low refractive index material layer 11a is located on a light exiting side of the light guide plate 10 and is in contact with a surface of the light guide plate 10, the second low refractive index material layer 11b is located on a side of the light guide plate 10 opposite to the light exiting side of the light guide plate 10 and is in contact with a surface of the light guide plate 10, a light extracting opening 4 is arranged at a position of the first low refractive index material layer 11a corresponding to the preset position, and a light extraction pattern 21 is filled in the light extracting opening 4; each of a refractive index of the first low refractive index material layer 11a and a refractive index of the second low refractive index material layer 11b is smaller than a refractive index of the light guide plate 10, and a refractive index of the light extraction pattern 21 is greater than or equal to the refractive index of the light guide plate 10.

For convenience of understanding, assuming that the refractive index of the light guide plate 10 is n, the refractive index of the first low refractive index material layer 11a and the refractive index of the second low refractive index material layer 11b are both n'. When the first angle δ of the collimated polarized light incident into the light guide plate 10 satisfies a total reflection condition, the light is totally reflected at interfaces where the first low refractive index material layer 11a is in contact with the light guide plate 10 and where the second low refractive index material layer 11b is in contact with the light guide plate 10; at an interface where the light extraction pattern 21 is in contact with the light guide plate 10, since the refractive index of the light extraction pattern 21 is equal to or greater than the refractive index of the light guide plate 10, the total reflection condition is not satisfied and is broken, and light is extracted from the light extracting opening 4 and emitted to the liquid crystal layer 7.

As a specific example, taking the refractive index n of the light guide plate 10 being equal to 1.5, and the refractive index n' of the first low refractive index material layer 11a and the second low refractive index material layer 11b being equal to 1.25 as an example, a critical angle can be calculated to be equal to 56.4°. Based on this, δ may be set to a value in a range from 57° to 80°, for example, δ may be equal to 650.

In some implementations, when a thickness of the light extraction pattern 21 is different from a thickness of the first low refractive index material layer 11a, a step difference may be generated between the light extraction pattern 21 and the first low refractive index material layer 11a, which is not favorable for a subsequent preparation of other functional modules. In some implementations, a planarization layer 12 is formed on a side of the first low refractive index material layer 11a away from the light guide plate 10 to eliminate the above step difference. Those skilled in the art will appreciate that the provision of the planarization layer 12 is only an alternative implementation in the embodiment of the present disclosure, and the planarization layer 12 is not a necessary structure.

It should be noted that, since it is required to deflect the light by the liquid crystal prism when a gray scale control is performed, the light extracted from the light extracting opening 4 needs to be collimated polarized light. When the light provided from an external light source to the light inlet of the light guide plate 10 is natural light, a polarizer (not shown) is required to be disposed at the light inlet to convert the natural light into polarized light; when the light provided from the external light source to the light inlet of the light guide plate 10 is collimated polarized light, the polarizer is not required.

In the embodiment of the present disclosure, the display area 9a includes a plurality of sub-pixel areas 901, the light guide structure layer 2 includes a plurality of light extracting openings 4 located at preset positions and corresponding to the sub-pixel areas 901 one to one, the black matrix 5 includes a plurality of light blocking elements 5a corresponding to the sub-pixel areas 901 one to one, the reflection matrix 6 includes a plurality of light reflecting elements 6a corresponding to the sub-pixel areas 901 one to one, the light absorption structure layer 8 includes a plurality of light absorption elements 8a corresponding to the sub-pixel areas 901 one to one, and the light extracting openings 4, the light blocking elements 5a, the light reflecting elements 6a and the light absorption elements 8a are all located in the corresponding sub-pixel areas 901.

In any sub-pixel area 901, the position of the light absorption element 8a may be determined according to the light extracting opening 4, the light blocking element 5a, a light emitting element and actual light blocking requirements, and the technical solutions of the present disclosure do not limit a position relationship between the light absorption element 8a and the light extracting opening 4/the light blocking element 5a/the light emitting element, and only needs to ensure that the light absorption element 8a does not absorb the light reflected by the surface of the light reflecting element 6a, and can absorb at least a part of light reflected by the surface of the black matrix 5, so that the problem of light leakage in dark state can be improved to a certain extent, and the purpose of improving the contrast is achieved.

Considering that when the sub-pixel area 901 displays a low gray scale, the angle of light emitted to the light blocking element 5a is relatively large, and in such case, the reflectivity of the surface of the light blocking element 5a to the light is relatively high (the light blocking ratio of the light blocking element 5a to the light is relatively small), and the risk of light leakage in dark state is relatively large; in addition, after being reflected by the surface of the light blocking element 5a, the light with the relatively large angle easily enters the sub-pixel area 901, which is not favorable for an arrangement design of the light absorption element 8a.

Figure 6A:
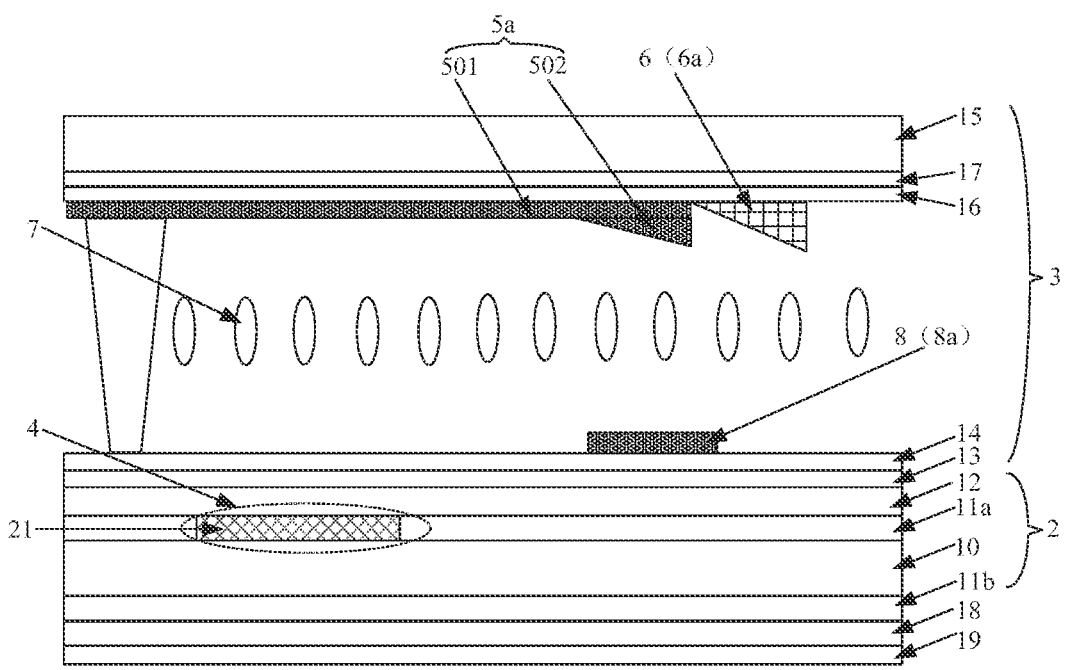
FIG. 6a is a schematic cross-sectional view of a display panel according to another embodiment of the present disclosure.
Figure 6B:
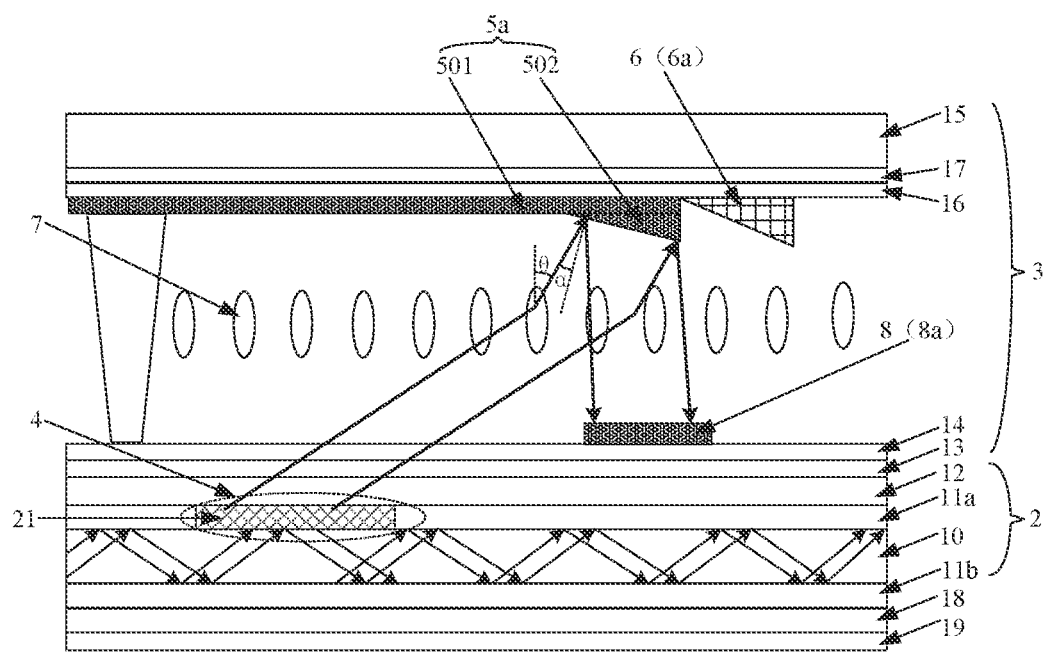
Figure 6C:
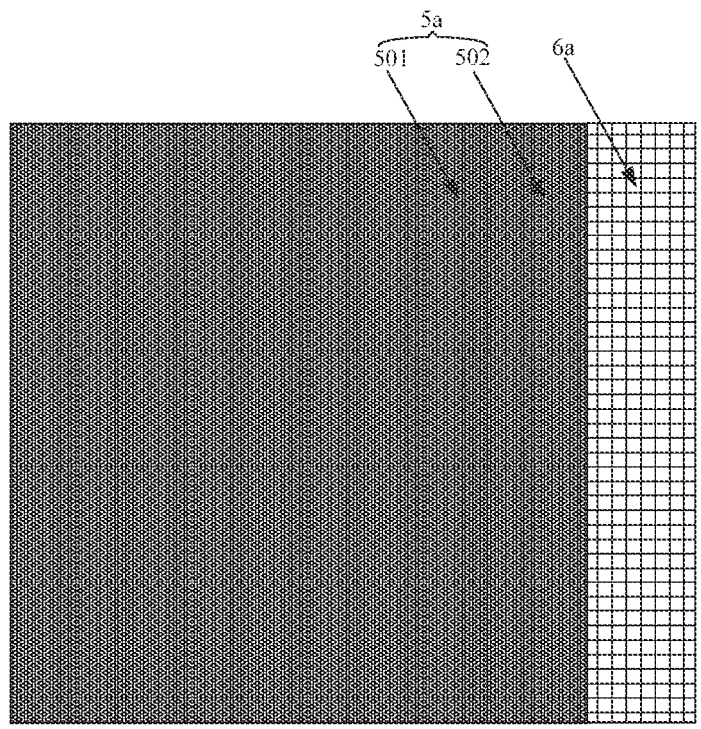

To solve the technical problem above, another embodiment of the present disclosure provides a new display panel. FIG. 6a is a schematic cross-sectional view of the display panel according to the another embodiment of the present disclosure, FIG. 6b is a schematic diagram of light paths corresponding to a gray scale L0 in FIG. 6a, and FIG. 6c is a bottom view of a light reflecting element and a light blocking element in FIG. 6a, and as shown in FIGS. 6a to 6b, different from the display panel shown in FIG. 3a, the light blocking element 5a in the display panel shown in FIG. 6a includes: a first light blocking pattern 501 and a second light blocking pattern 502; the second light blocking pattern 502 is located on a side of the first light blocking pattern 501 proximal to the light adjusting structure, a surface of the second light blocking pattern 502 away from the first light blocking pattern 501 is a first inclined surface, a plane where the first inclined surface is located is intersected with a plane where the first light blocking pattern 501 is located, and the first inclined surface faces the light extracting opening 4 located in the sub-pixel area 901 where the light blocking element 5a is located.

In such case, since the surface of the light blocking element 5a proximal to the light adjusting structure is designed to be an inclined surface and faces the light extracting opening 4, an incident angle formed by the light emitted from the light extracting opening 4 to the first inclined surface of the light blocking element 5a and the first inclined surface is reduced.

Taking a case of displaying the gray scale L0 as an example, a driving electric field is applied. In the related art, as shown in FIG. 1, light emitted from the light extracting opening 4 to the light blocking element 5a at the second angle propagates at a third angle θ after being deflected by the liquid crystal prism, and an incident angle formed by the light propagating at the third angle θ and reaching the surface of the light blocking element 5a and the surface of the light blocking element 5a is equal to the third angle θ. In the embodiment of the present disclosure, since the light blocking element 5a has the first inclined surface facing the light extracting opening 4, an incident angle α formed by the light propagating at the third angle θ after being deflected by the liquid crystal prism and the surface of the light blocking element 5a is smaller than the third angle. Since the smaller the incident angle is, the smaller the reflectivity of the light blocking element 5a to the light is (the larger the light blocking ratio is), the quantity of light reflected by the first inclined surface is reduced, and the risk of light leakage in dark state can be effectively reduced. In addition, the reflection angle of the light reflected by the first inclined surface is relatively small, and thus the light does not enter other sub-pixel areas 901, which is beneficial to a layout design of the light absorption elements 8a.

In some implementations, in each sub-pixel area 901, the light reflecting element 6a is farther from the light extracting opening 4 than the second light blocking pattern 502, and an orthogonal projection of the second light blocking pattern 502 on a plane where the first light blocking pattern 501 is located is in contact with an orthogonal projection of the light reflecting element 6a on a plane where the first light blocking pattern 501 is located.

As shown in FIG. 1, the light reflected by the part of the light blocking element 5a proximal to the light reflecting element 6a partially overlaps with the light reflected by the light reflecting element 6a, and in such case, if the light absorption element 8a is disposed at the position where the light is overlapped, the light absorption element 8a not only absorbs the light reflected by the light blocking element 5a, but also absorbs a part of light reflected by the light reflecting element 6a, which results in a decrease in display brightness.

Therefore, in the present disclosure, the orthographic projection of the second light blocking pattern 502 on the plane where the first light blocking pattern 501 is located is in contact with the orthographic projection of the light reflecting element 6a on the plane where the first light blocking pattern 501 is located, that is, the second light blocking pattern 502 is disposed near the light reflecting element 6a, and the light path of the light reflected by the light blocking element 5a and located around the light reflecting element 6a is changed by the first inclined surface, so that the light reflected by the part of the light blocking element 5a proximal to the light reflecting element 6a do not overlap the light reflected by the light reflecting element 6a, and in such case, the position of the light absorption element 8a is determined according to the light path of the light reflected by the first inclined surface, so that the light absorption element 8a only absorbs the light reflected by the light blocking element 5a, but does not absorb the light reflected by the light reflecting element 6a.

Figure 7A:
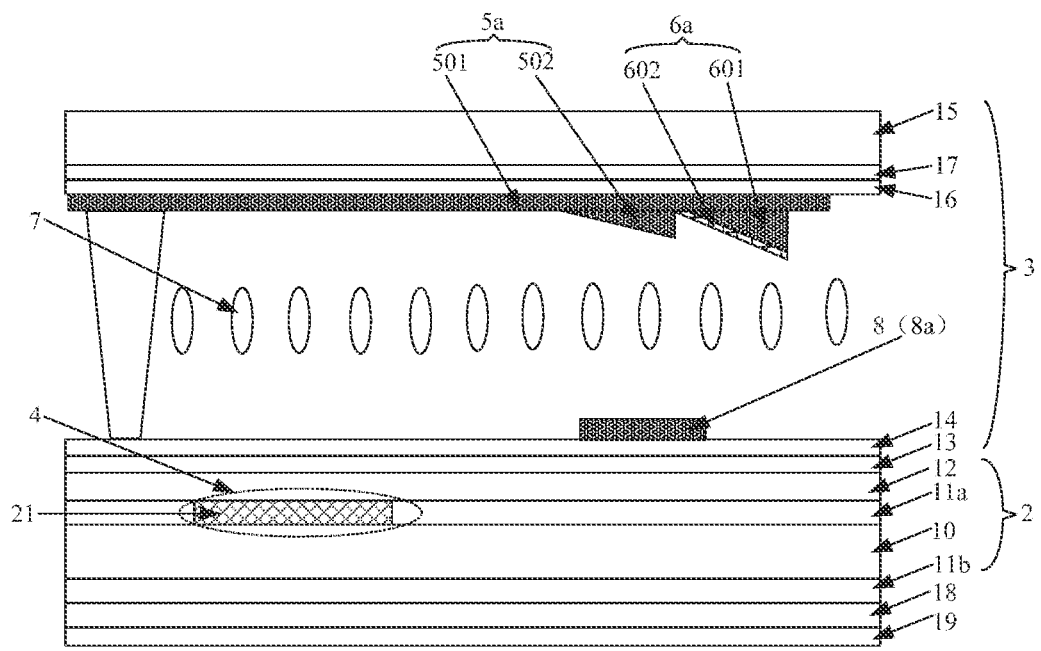
FIG. 7a is a schematic cross-sectional view of a display panel according to further another embodiment of the present disclosure.
Figure 7B:
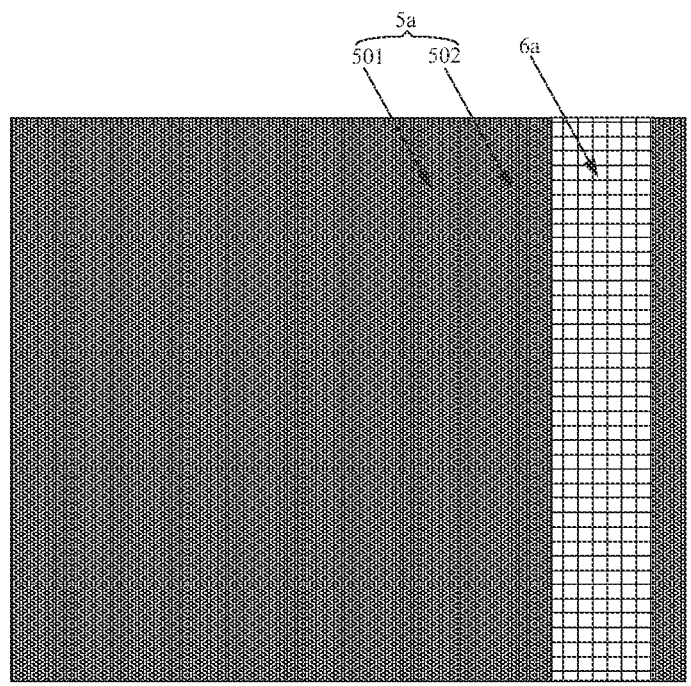

FIG. 7a is a schematic cross-sectional view of a display panel according to further another embodiment of the present disclosure, and FIG. 7b is a bottom view of the light reflecting element and the light blocking element in FIG. 7a, and as shown in FIG. 7a and FIG. 7b, different from the display panel shown in FIG. 6a, in each sub-pixel area 901, the light reflecting element 6a is located on a side of the first light blocking pattern 501 proximal to the light adjusting structure, and the light reflecting element 6a and the second light blocking pattern 502 are arranged side by side (arranged side by side and in parallel to a plane where the first light blocking pattern 501 is located) and in contact with each other on the surface of the first light blocking pattern 501 proximal to the light adjusting structure.

Compared to the first light blocking pattern 501 in the display panel shown in FIG. 6a, the first light blocking pattern 501 in FIG. 7 further extends to a lower side of the light reflecting element 6a (does not extend to the transparent area 9b).

In some implementations, the light reflecting element 6a includes: a body 601 and a reflective layer 602, where a surface of the body 601 away from the first light blocking pattern 501 is a second inclined surface, a plane where the second inclined surface is located is intersected with the plane where the first light blocking pattern 501 is located, the second inclined surface faces the light extracting opening 4 located in the sub-pixel area 901 where the light reflecting element 6a is located, and the reflective layer 602 is arranged on the second inclined surface.

Further, the body 601, the first light blocking pattern 501 and the second light blocking pattern 502 are integrally formed as a single piece. In such case, the body 601 may be formed simultaneously with the second light blocking pattern 502, which can reduce manufacturing processes and shorten a production cycle; the specific method for manufacturing the display panel will be described in detail later.

Figure 8:
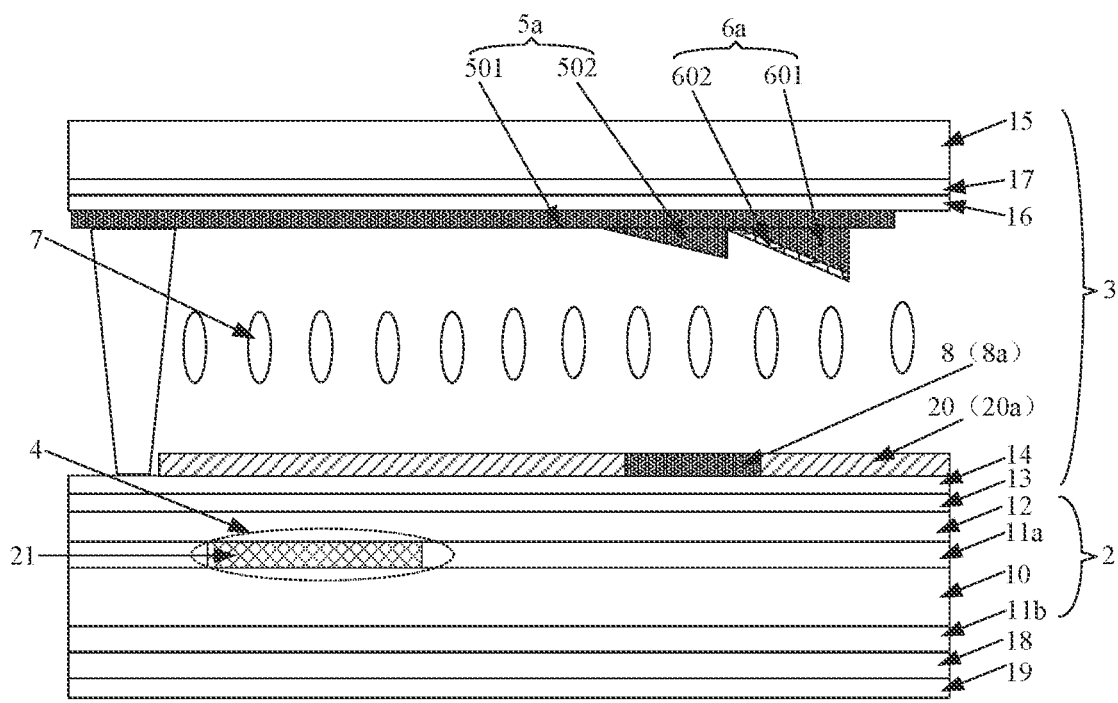
FIG. 8 is a schematic cross-sectional view of a display panel according to still another embodiment of the present disclosure.

FIG. 8 is a schematic cross-sectional view of a display panel according to still another embodiment of the present disclosure, and as shown in FIG. 8, different from the previous embodiments, the display structure layer 3 in the display panel shown in FIG. 8 further includes a color filter matrix 20, so that the display panel can perform color display. The color filter matrix 20 is arranged at a side of the light adjusting structure away from the reflection matrix 6, and the color filter matrix 20 is configured to filter light emitted from a preset position and/or to filter light reflected by a surface of the reflection matrix 6.

Specifically, the color filter matrix 20 includes a plurality of color filter patterns 20a in one-to-one correspondence with the sub-pixel areas 901. The color filter patterns 20a may completely cover the corresponding sub-pixel areas 901. According to a difference in filter area, each of the color filter patterns 20a may include a first filter sub-pattern for filtering light emitted from the light extracting opening 4 and a second filter sub-pattern for filtering light reflected by the surface of the reflection matrix 6, the first filter sub-pattern and the second filter sub-pattern being color filter sub-patterns for a same color.

As shown in FIG. 8, the light emitted from the light extracting opening 4 to the reflecting element is first filtered by the first filter sub-pattern, and the light reflected by the reflecting element is secondly filtered by the second filter sub-pattern. Considering that the light will be filtered twice, the first filter sub-pattern and the second filter sub-pattern may be set thinner, so that the effect of the filtering twice in the present disclosure is equal to that of one filter pattern in related art.

It will be appreciated by those skilled in the art that, in the embodiment of the present disclosure, color display can be achieved by providing only the first filter sub-pattern to filter the light emitted from the light extracting opening 4 to the reflecting element, or by providing only the second filter sub-pattern to filter the light reflected by the surface of the reflection matrix 6, and such cases are not shown by corresponding figures.

It should be noted that, only a case where the color filter matrix 20 and the light absorption structure layer 8 are in a same layer is illustrated in the drawings, which only serve as an example and do not limit the technical solutions of the present disclosure. In the present disclosure, it is only necessary to ensure that the color filter matrix 20 is disposed on a side of the liquid crystal layer 7 away from the reflection matrix 6, for example, the color filter matrix 20 may be located on a side of the light absorption structure layer 8 away from the liquid crystal layer 7 (i.e., the lower side of the light absorption structure layer 8 in the drawing).

With continued reference to FIGS. 3a, and 6a to 8, in some implementations, the light adjusting structure includes a liquid crystal layer 7, and the display structure layer 3 further includes: a base substrate 15, a first electrode layer 16, and a second electrode layer 13; the first electrode layer 16 is positioned on a side of the base substrate 15 proximal to the liquid crystal layer 7, the black matrix 5 and the reflection matrix 6 are positioned on a side of the first electrode layer 16 proximal to the liquid crystal layer 7, and the second electrode layer 13 is positioned on a side of the liquid crystal layer 7 away from the black matrix 5; the light absorption structure layer 8 is located between the second electrode layer 13 and the liquid crystal layer 7.

In some implementations, the first electrode layer 16 is a pixel electrode layer, the second electrode layer 13 is a common electrode layer, the pixel electrode layer includes a plurality of pixel electrodes in one-to-one correspondence with the sub-pixel areas 901, and the common electrode layer includes a plate-shaped common electrode; when different voltages are applied to the common electrode and the pixel electrode, a driving electric field is formed between the common electrode and the pixel electrode, and the deflection degree of light deflected by the liquid crystal prism in the corresponding sub-pixel area 901 is controlled by controlling the intensity of the driving electric field, so that the quantity of light emitted to the reflecting surface of the light reflecting element 6a can be controlled, namely, the control of the display brightness in the sub-pixel area 901 is realized.

In some implementations, a pixel circuit layer 17 is formed between the pixel electrode layer and the base substrate 15, and the pixel circuit layer 17 includes a thin film transistor (TFT), a signal wiring, and other structures, and is configured to provide a pixel voltage to each pixel electrode.

With continued reference to FIGS. 3a to 8, in some implementations, a protective layer 14 is disposed between the second electrode layer 13 and the light absorption structure layer 8, and the protective layer 14 is in contact with the light absorption structure layer 8, the protective layer 14 being configured to prevent material residue from occurring in a non-pattern area during a process of forming a pattern of the light absorption structure layer 8 through a patterning process.

In some implementations, the light absorption structure layer 8 is made of a material the same as that of the black matrix 5, specifically, may be made of a mixture of colloid, carbon, and the like. When an organic film layer or a metal oxide film layer is disposed below the light absorption structure layer 8 (for example, a material of the second electrode layer 13 generally includes indium tin oxide or indium gallium zinc oxide), carbon residue is very likely to occur in a non-pattern area (an area where the material of the light absorption structure layer 8 needs to be removed) during a process of forming a pattern of the light absorption structure layer 8 by a patterning process, thereby causing a defect. Therefore, in the embodiment of the present disclosure, the protective layer 14 is disposed between the second electrode layer 13 and the light absorption structure layer 8, and the protective layer 14 is in contact with the light absorption structure layer 8, so that the problem of carbon residue can be effectively avoided. In some implementations, a material of the protective layer 14 includes silicon oxide (chemical formula being $SiO_2$), carbon is not easy to remain on the surface of the silicon oxide.

With continued reference to FIGS. 3 to 6, in some implementations, a scattering layer 18 is disposed on a side of the light guide structure layer 2 away from the liquid crystal layer 7, and the scattering layer 18 can scatter light emitted from a surface of the light guide structure layer 2 away from the liquid crystal layer 7 to increase a viewing angle of the display panel. In some implementations, a thickness of the scattering layer 18 ranges from 0.5 µm to 3.5 µm, and a material of the scattering layer 18 includes: thermoplastic matrix material and titanium dioxide particles, where the thermoplastic matrix material may be polyacrylic resin, polyurethane, polycarbonate and the like, and a diameter of the titanium dioxide particle ranges from 150 nm to 800 nm.

Further, a protective layer 19 is disposed on a side of the scattering layer 18 away from the light guide structure layer 2, for protecting the scattering layer.

In the embodiment of the present disclosure, the light absorption structure layer 8 is disposed on a side of the liquid crystal layer 7 away from the black matrix 5, so as to absorb the light reflected by the surface of the black matrix 5 and allow the light reflected by the surface of the reflection matrix 6 to pass through, thereby effectively avoiding the problem of light leakage in dark state caused by reflection of the black matrix 5 without affecting display, and thus effectively improving the contrast of the display device.

Figure 9:
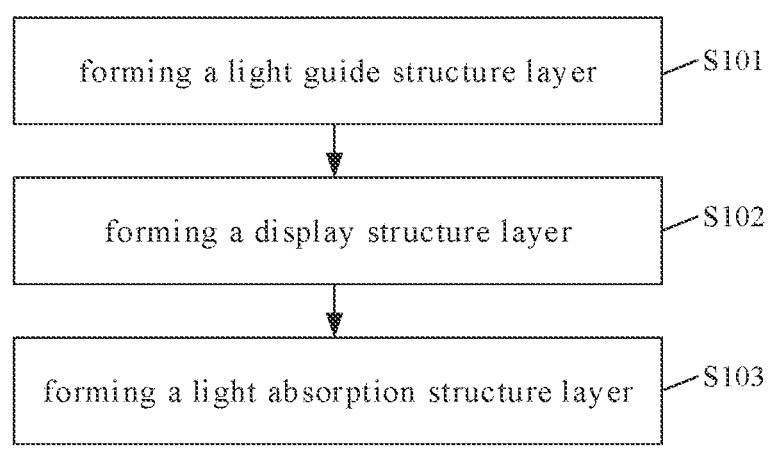
FIG. 9 shows a method for manufacturing a display panel according to an embodiment of the present disclosure.

FIG. 9 is a method for manufacturing a display panel according to an embodiment of the present disclosure, and as shown in FIG. 9, the method according to the embodiment of the present disclosure is suitable for manufacturing the display panels according to the previous embodiments, and the method includes following steps S101 to S103.

Step S101, forming a light guide structure layer.

The light guide structure layer 2 has a light exiting side, and the light guide structure is configured to enable light to emit from a preset position of the light exiting side.

Step S102, forming a display structure layer.

The display structure layer 3 is disposed on the light exiting side of the light guide structure layer 2, and includes a light adjusting structure, and a black matrix 5 and a reflection matrix 6 that are located on a side of the light adjusting structure away from the light guide structure layer 2, where the light adjusting structure is configured to control the light emitted from the preset position to enter an area where the black matrix 5 is located and/or an area where the reflection matrix 6 is located.

In some implementations, the light adjusting structure includes a liquid crystal layer 7.

Step S103, forming a light absorption structure layer.

The light absorption structure layer 8 is located on a side of the light adjusting structure away from the black matrix 5, and the light absorption structure layer 8 is configured to absorb the light reflected by the surface of the black matrix 5 and allow the light reflected by the reflective surface of the reflection matrix 6 to pass through.

The technical solution of the present disclosure does not limit the execution sequence of the above step S101 to step S103.

Figure 10:
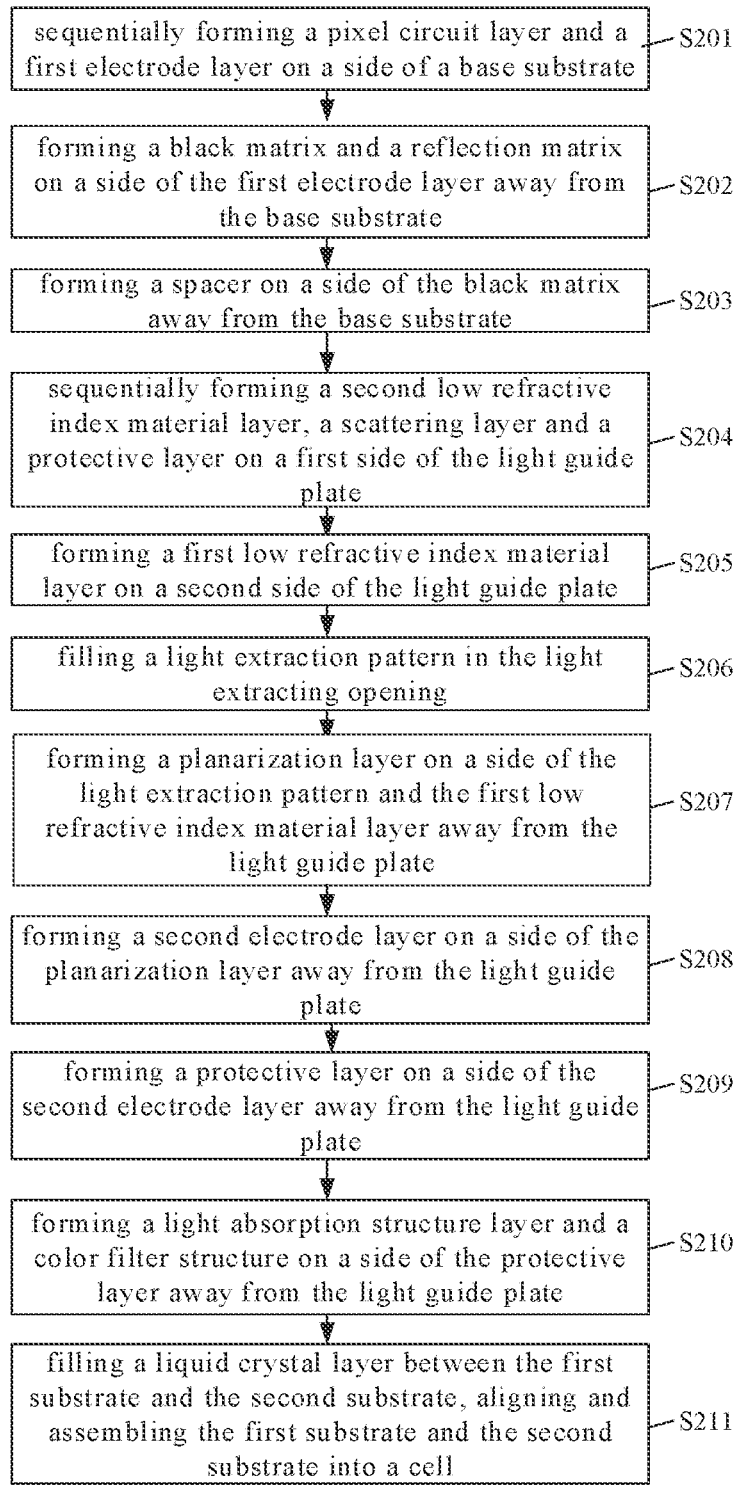
FIG. 10 shows a method for manufacturing a display panel according to another embodiment of the present disclosure.

FIG. 10 shows a method for manufacturing a display panel according to another embodiment of the present disclosure, FIGS. 11 to 21 are schematic cross-sectional views of intermediate products during manufacturing the display panel, and as shown in FIGS. 10 to 21, the method provided in the embodiment of the present disclosure is suitable for manufacturing the display panel in the foregoing embodiment, in the display panel, the display structure layer 3 has a display area 9*a*, and the display area 9*a* includes a plurality of sub-pixel areas 901; the light guide structure layer 2 includes a plurality of light extracting openings 4 which are positioned at preset positions and correspond to the sub-pixel areas 901 one by one; the black matrix 5 includes a plurality of light blocking elements 5*a* in one-to-one correspondence with the sub-pixel areas 901; the reflection matrix 6 includes a plurality of light reflecting elements 6*a* corresponding to the sub-pixel areas 901 one to one; the light absorption structure layer 8 includes a plurality of light absorption elements 8*a* corresponding to the sub-pixel areas 901 one by one; the light extracting openings 4, the light blocking elements 5*a*, the light reflecting elements 6*a* and the light absorption elements 8*a* are all located in the corresponding sub-pixel areas 901. The method specifically includes following steps S201 to S211.

Step S201, sequentially forming a pixel circuit layer and a first electrode layer on a side of a base substrate.

Figure 11:
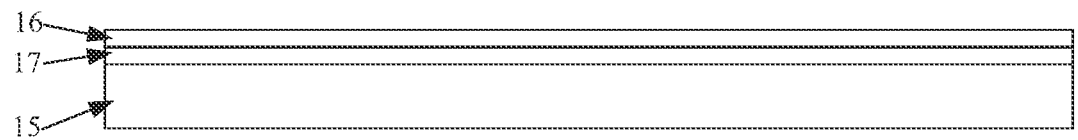
FIGS. 11 to 21 are schematic cross-sectional views of intermediate products during manufacturing a display panel.

As shown in FIG. 11, the pixel circuit layer and the first electrode layer 16 may be formed on the base substrate 15 by a conventional TFT backplane process, the specific process of which is not described in detail herein.

Step S202, forming a black matrix and a reflection matrix on a side of the first electrode layer away from the base substrate.

Figure 22:
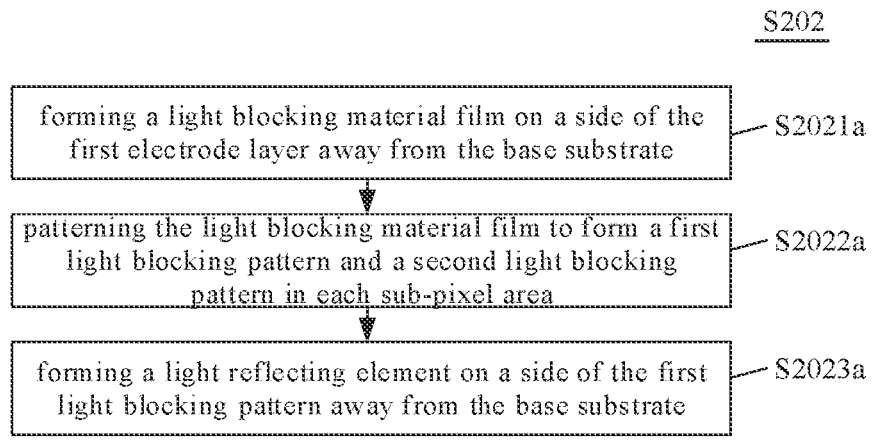
FIG. 22 is a flowchart of an alternative implementation of step S202 in the embodiment of the present disclosure.
Figure 23:
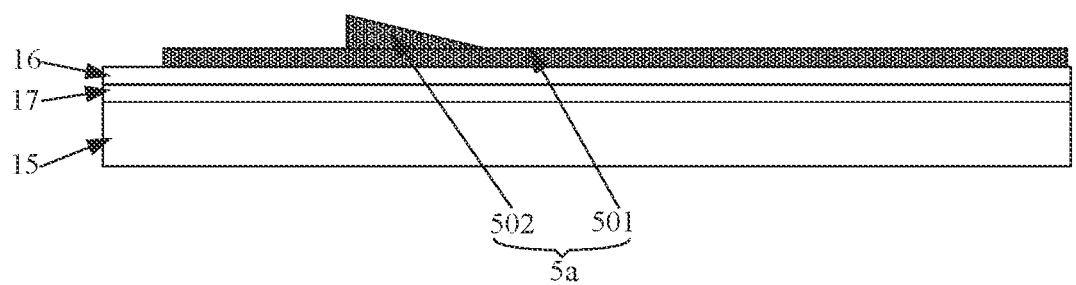
FIG. 23 is a schematic cross-sectional view of an intermediate product during a process corresponding to FIG. 22.

FIG. 22 is a flowchart of an alternative implementation of step S202 in the embodiment of the present disclosure, FIG. 23 is a schematic cross-sectional view of an intermediate product during a process corresponding to FIG. 22, and as shown in FIGS. 22 and 23, the step S202 includes following steps S2021*a* to S2023*a*.

Step S2021*a*, forming a light blocking material film on a side of the first electrode layer away from the base substrate.

As shown in FIG. 23, the light blocking material film is formed on the side of the first electrode layer 16 away from the base substrate 15 by a coating process; the light blocking material film may be made of a carbon-containing photoresist.

Step S2022*a*, patterning the light blocking material film to form a first light blocking pattern and a second light blocking pattern in each sub-pixel area.

The patterning the light blocking material thin film includes an exposure using a mask, development, and the like. As shown in FIG. 23, the first light blocking pattern 501 and the second light blocking pattern 502 can be formed in each sub-pixel area 901 by the step S2022a, the second light blocking pattern 502 is located on a side of the first light blocking pattern 501 away from the base substrate 15, a surface of the second light blocking pattern 502 away from the first light blocking pattern 501 is a first inclined surface, a plane where the first inclined surface is located is intersected with a plane where the first light blocking pattern 501 is located, and the first light blocking pattern 501 and the second light blocking pattern 502 located in a same sub-pixel area 901 constitute a light blocking element 5a.

A half-tone mask may be used to expose the light blocking material film during the process of exposure, so as to form the first inclined surface after development.

Step S2023a, forming a light reflecting element on a side of the first light blocking pattern away from the base substrate.

Figure 24:
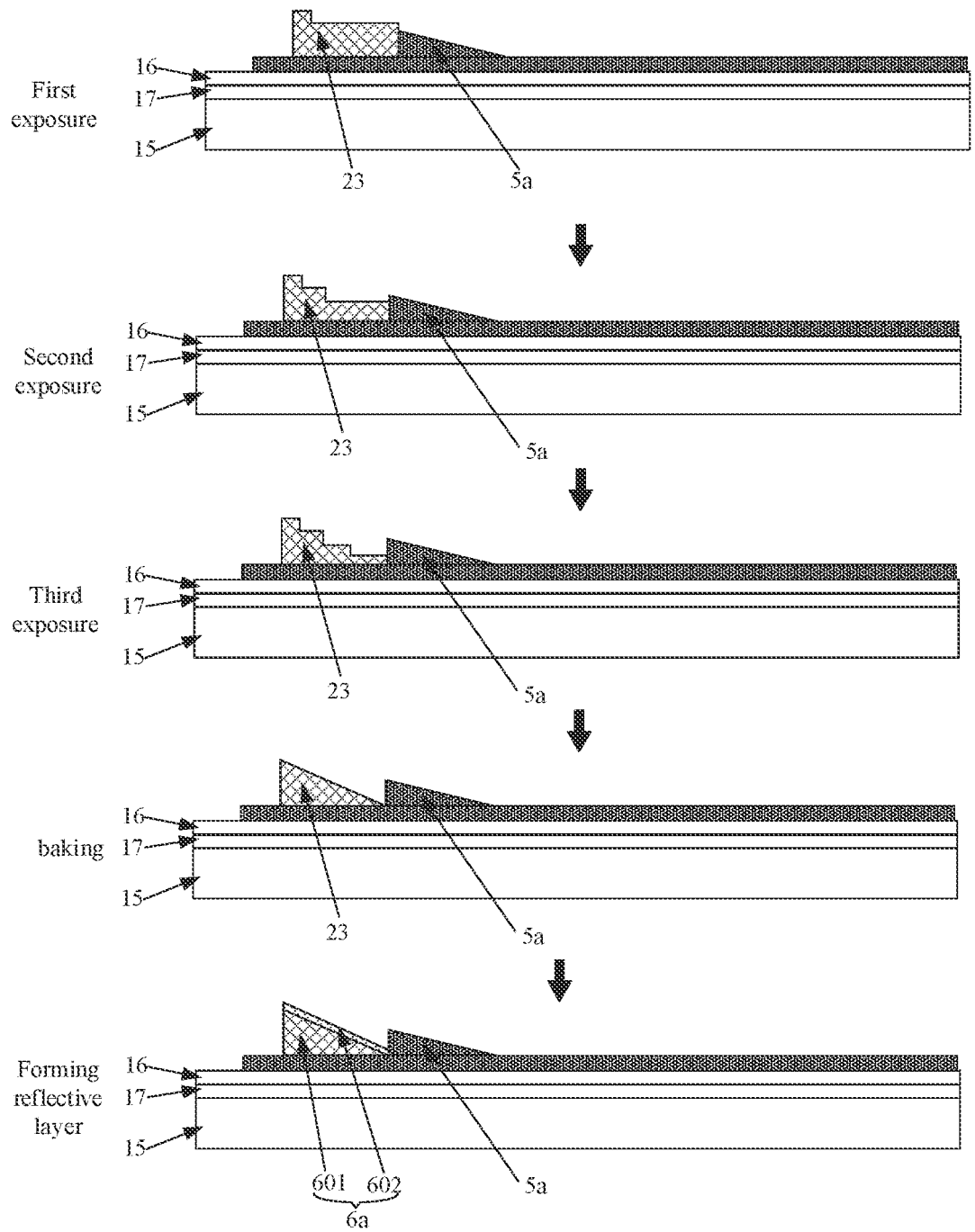
FIG. 24 is a schematic view of a process for forming a light reflecting element by using a multi-patterning process and a baking process.

FIG. 24 is a schematic view of a process for forming the light reflecting element 6a by using a multiple patterning process and a baking process, and as shown in FIG. 24, first, a layer of photoresist 23 is coated on the surface of the substrate prepared in step S2022; then, the photoresist 23 is subjected to a patterning process for a plurality of times to form a step profile; then, baking the photoresist 23 so that the photoresist 23 is melted by heating and flows, thereby forming an inclined surface; then, depositing a metal material film; finally, patterning the metal material film to form the reflective layer 602 on the inclined surface. The patterning the metal material film includes coating photoresist, exposing the photoresist by using a mask, developing, etching the metal material film (e.g., by wet etching), and stripping the photoresist.

Figure 25:
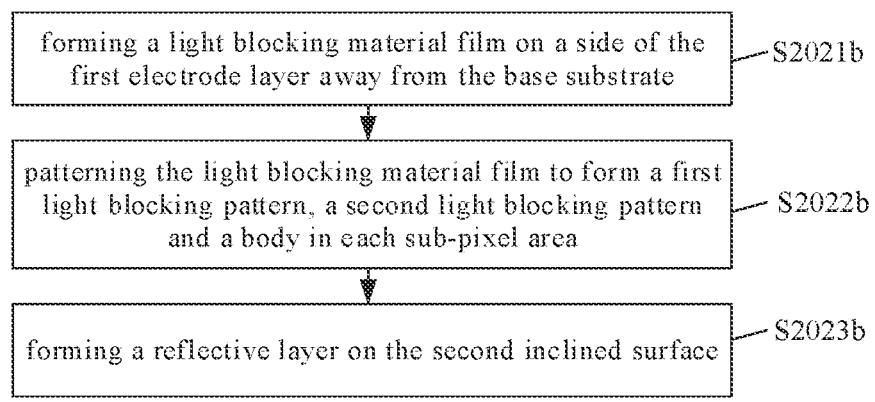
FIG. 25 is a flowchart of an alternative implementation of step S202 in the embodiment of the present disclosure.
Figure 26:
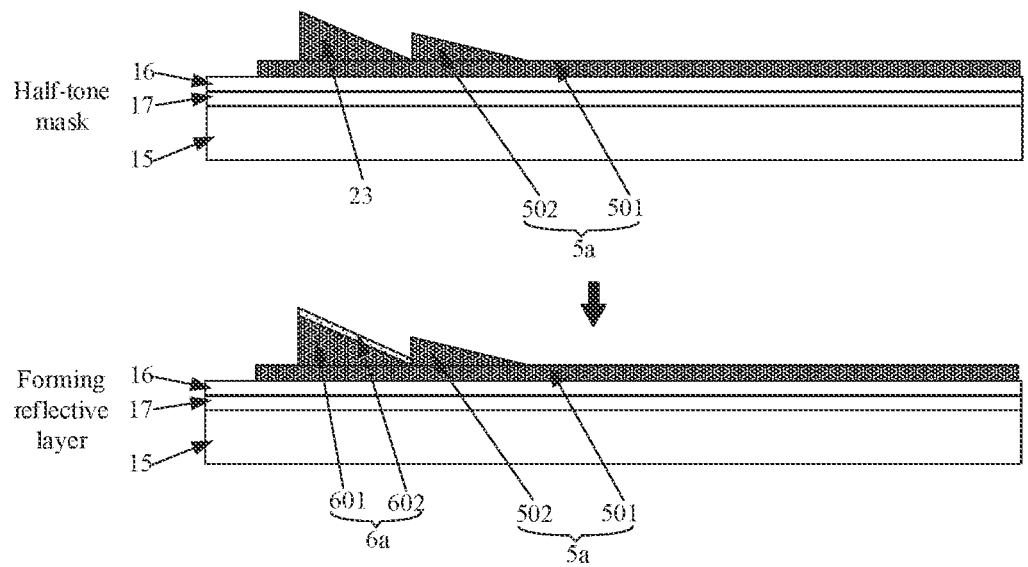
FIG. 26 is a schematic cross-sectional view of an intermediate product during a process corresponding to FIG. 25.

FIG. 25 is a flowchart of another alternative implementation of step S202 in the embodiment of the present disclosure, FIG. 26 is a schematic cross-sectional view of an intermediate product during a process corresponding to FIG. 25, and as shown in FIGS. 25 and 26, step S202 includes following steps S2021b to S2023b.

Step S2021b, forming a light blocking material film on a side of the first electrode layer away from the base substrate.

Step S2022b, patterning the light blocking material film to form a first light blocking pattern, a second light blocking pattern and a body in each sub-pixel area.

Different from the case shown in FIG. 23, in the case shown in FIG. 26, the material of the body 601 in the light reflecting element 6a is the same as that of the black matrix 5, and the first light blocking pattern 501, the second light blocking pattern 502, and the body 601 are integrally formed as a single piece. The first inclined surface of the second light blocking pattern 502 and the second inclined surface of the body 601 may be formed through a half-tone mask process. The first light blocking pattern 501 and the second light blocking pattern 502 located in a same sub-pixel area 901 form a light blocking element 5a.

Step S2023b, forming a reflective layer on the second inclined surface.

The material of the reflective layer 602 may be a metal material, the body 601 and the reflective layer 602 located in the same sub-pixel area 901 form a light reflecting element 6a, and the light reflecting element is in contact with the light blocking element 5a.

Figure 12:
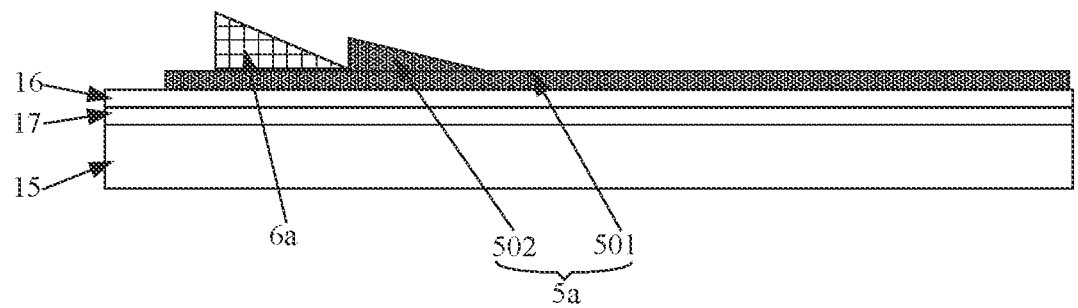

Referring to FIG. 12, the black matrix 5 and the reflection matrix 6 may be formed based on the above-described steps S2021a to S2023a or steps S2021b to S2023b.

Step S203, forming a spacer on a side of the black matrix away from the base substrate.

Figure 13:
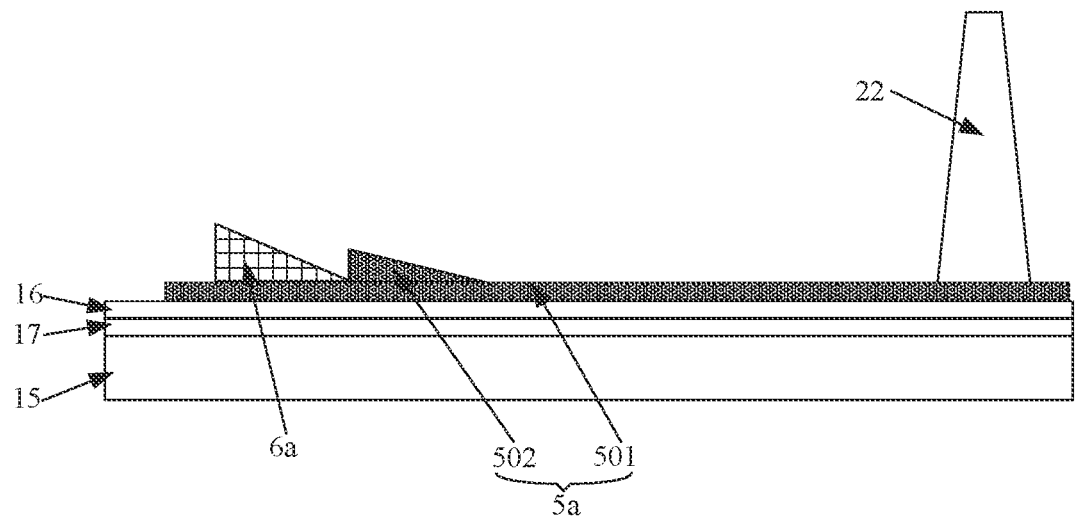

As shown in FIG. 13, the spacers 22 may be formed on the side of the black matrix 5 away from the base substrate 15 by a conventional process for preparing the spacer 22.

For convenience of description, the structure obtained through the above-described steps S201 to S203 will be referred to as a "first substrate".

Step S204, taking a light guide plate as a substrate, and sequentially forming a second low refractive index material layer, a scattering layer and a protective layer on a first side of the light guide plate.

Figure 14:
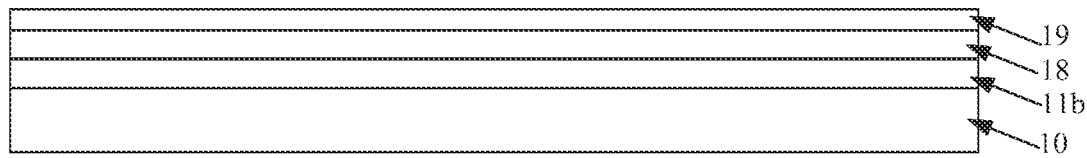

As shown in FIG. 14, the light guide plate 10 is a glass light guide plate, and a second low refractive index material layer 11b, a scattering layer 18, and a protective layer 19 are laminated in this order on a first side (a side away from the light exiting side) of the light guide plate 10; where the refractive index of the second low refractive index material layer 11b is smaller than that of the light guide plate 10.

Step S205, forming a first low refractive index material layer on a second side of the light guide plate by using the light guide plate as a substrate.

Figure 15:
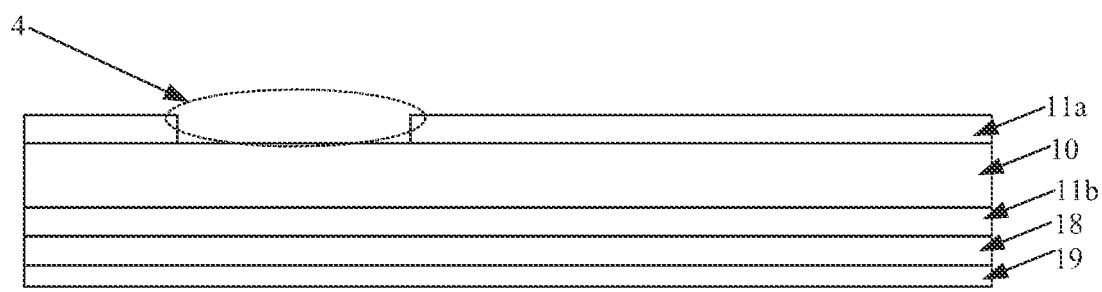

As shown in FIG. 15, the structure shown in FIG. 14 is rotated by 180° to make the protective layer 19 located at the lowest position, the light guide plate 10 is used as a substrate, a first low refractive index material layer 11a is formed on the second side (light exiting side) of the light guide plate 10, and the first low refractive index material layer 11a has a hollow structure corresponding to the "preset position" to form the light extracting opening 4; the refractive index of the first low refractive index material layer 11a is smaller than that of the light guide plate 10.

Step S206, filling a light extraction pattern in the light extracting opening.

Figure 16:
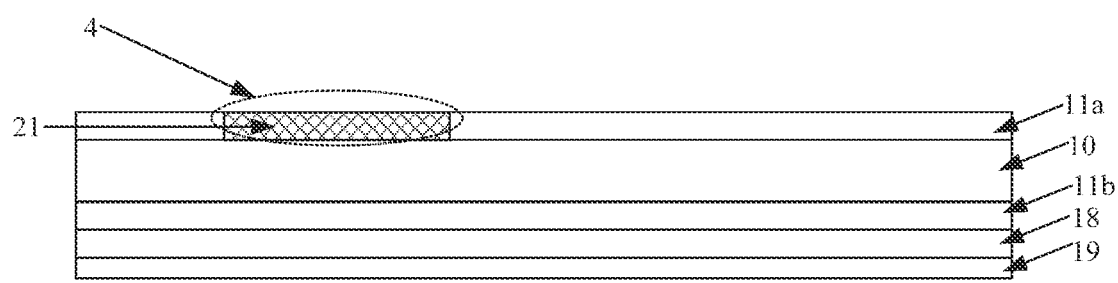

As shown in FIG. 16, a light extraction pattern 21 is formed in the light extracting opening 4, and the refractive index of the light extraction pattern 21 is larger than the refractive index of the light guide plate 10.

Step S207, forming a planarization layer on a side of the light extraction pattern and the first low refractive index material layer away from the light guide plate.

Figure 17:
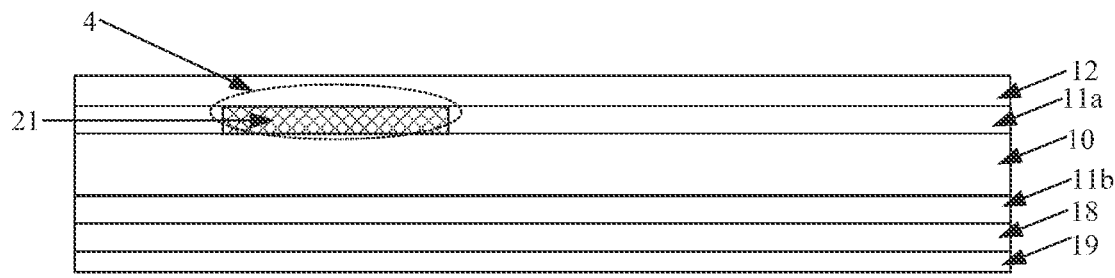

As shown in FIG. 17, a planarized surface provided by the planarization layer 12 facilitates the fabrication of other structures during subsequent processing. Note that, in order to avoid total reflection of light at the interface between the light extraction pattern 21 and the planarization layer 12, the refractive index of the planarization layer 12 is equal to or greater than the refractive index of the light extraction pattern 21.

Step S208, forming a second electrode layer on a side of the planarization layer away from the light guide plate.

Figure 18:
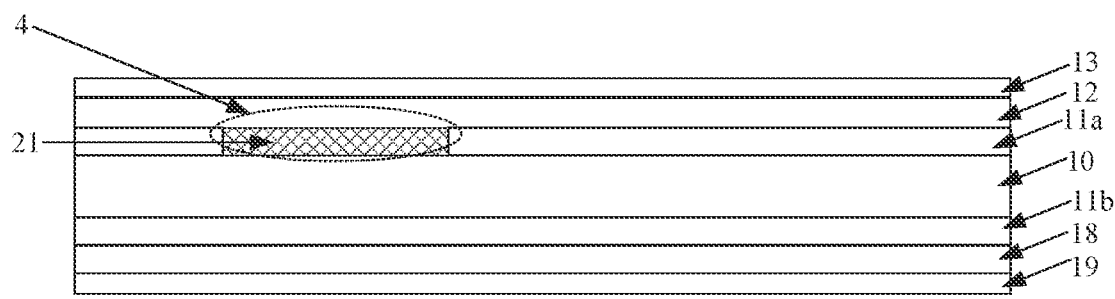

As shown in FIG. 18, the second electrode layer 13 functions as a common electrode layer.

Step S209, forming a protective layer on a side of the second electrode layer away from the light guide plate.

Figure 19:
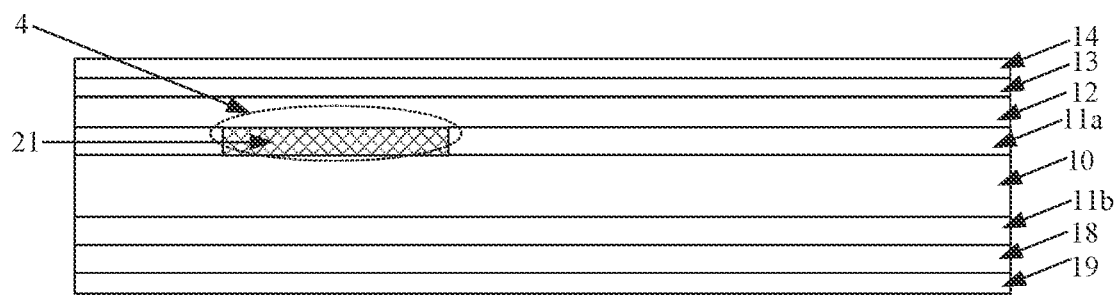

As shown in FIG. 19, in some implementations, the material of the protective layer 14 includes silicon oxide.

Step S210, forming a light absorption structure layer and a color filter structure on a side of the protective layer away from the light guide plate.

Figure 20:
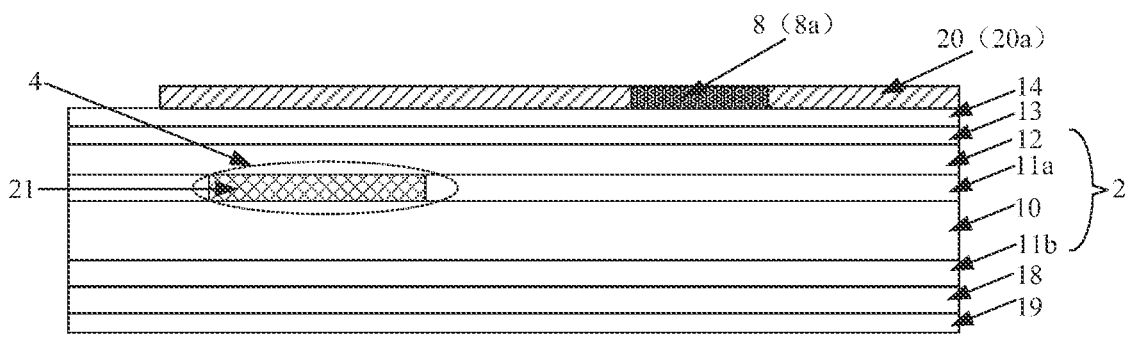

As shown in FIG. 20, the material of the light absorption structure layer 8 is the same as that of the black matrix 5, and the position of each light absorption element 8a in the light absorption structure layer 8 may be designed and adjusted in advance according to actual needs. The filter characteristics and positions of color filter patterns 20a in the color filter structure may be designed in advance according to actual needs.

For convenience of description, the structure obtained through the above-described steps S204 to S210 will be referred to as a "second substrate".

Step S211, filling a liquid crystal layer between the first substrate and the second substrate, aligning and assembling the first substrate and the second substrate into a cell.

Figure 21:
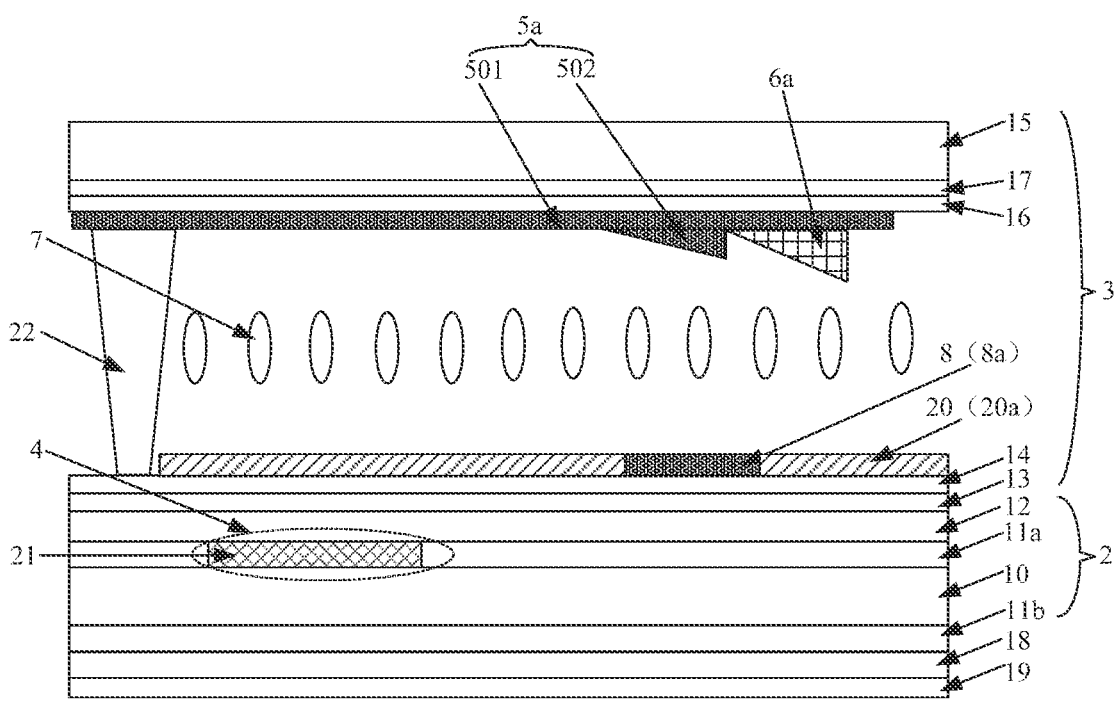

As shown in FIG. 21, the first substrate obtained in step S203 and the second substrate obtained in step S210 are aligned and assembled into a cell to obtain a display substrate; the specific process of aligning and assembling may be conventional in the related art, and is not described herein again.

Figure 27:
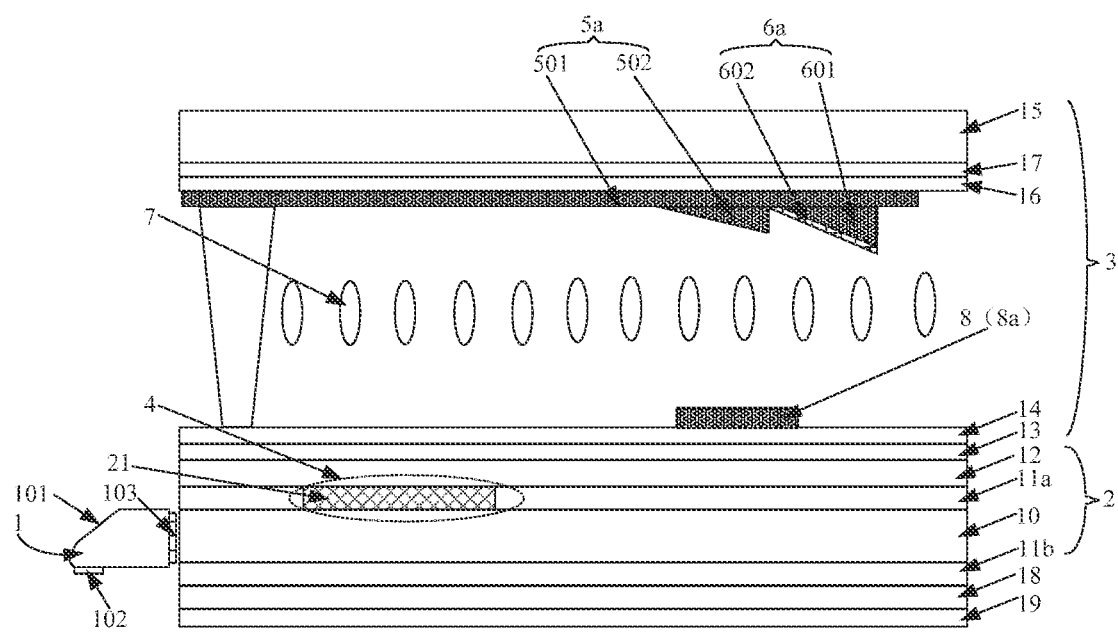
FIG. 27 is a schematic cross-sectional view of a display device according to an embodiment of the present disclosure.

An embodiment of the present disclosure further provides a display device. FIG. 27 is a schematic cross-sectional view of a display device according to an embodiment of the present disclosure, and as shown in FIG. 27, the display device includes: a collimated light source 1 and a display panel, where a light outlet of the collimated light source 1 is opposite to a light inlet of the light guide structure layer 2, and the display panel is the display panel provided by the foregoing embodiment.

In some implementations, the collimated light source 1 includes: a collimating element 101, a light source element 102, and a polarizing element 103; the light source element 102 may include a plurality of stacked monochromatic light sources for sequentially emitting monochromatic light of different colors in a display period (color display can be achieved without the color filter matrix 20). The collimating element 101 has a parabolic reflecting surface structure, the light incident surface of the collimating element is fit to the light exiting surface of the light source element, and the surface opposite to the light incident surface is set to be a parabolic reflecting surface, so that the divergent light emitted from the light source element 102 can be processed into collimated light and reflected into the light guide device at a preset angle. In general, difference in the refractive index of light of different wavelengths is small, and thus the angles at which light of different colors enter the light guide plate 10 are the same. A polarizing element 103 is disposed on a light exiting surface of the collimating element, and is configured to process light emitted from the collimating element 101 into linearly polarized light.

The display device in the embodiment of the present disclosure may be any product or component having a display function, such as a mobile phone, a tablet computer, a television, a notebook computer, a digital photo frame, a navigator, and the like, and may also be a virtual/augmented reality head-mounted display, a device or an apparatus having a near-eye 3D display function.

It will be understood that the above implementations are merely exemplary implementations employed to illustrate the principles of the present disclosure, and the present disclosure is not limited thereto. It will be apparent to those skilled in the art that various changes and modifications can be made therein without departing from the spirit and scope of the present disclosure, and these changes and modifications are to be considered within the scope of the present disclosure.

The invention claimed is:

1. A display panel, comprising:
    a light guide structure layer having a light exiting side and configured to enable internal light to be emitted from a preset position of the light exiting side;
    a display structure layer arranged on the light exiting side of the light guide structure layer and comprises a light adjusting structure, a black matrix and a reflection matrix, the black matrix and the reflection matrix are positioned on a side, away from the light guide structure layer, of the light adjusting structure, and the light adjusting structure is configured to control light emitted from the preset position to be incident into an area where the black matrix is positioned and/or an area where the reflection matrix is positioned; and
    a light absorption structure layer positioned on a side of the light adjusting structure away from the black matrix, and configured to absorb light reflected by a surface of the black matrix and allow light reflected by a surface of the reflection matrix to pass through.

2. The display panel of claim 1, wherein the display structure layer has a display area comprising a plurality of sub-pixel areas;
    the light guide structure layer comprises a plurality of light extracting openings which are positioned at preset positions and correspond to the sub-pixel areas one by one;
    the black matrix comprises a plurality of light blocking elements which correspond to the sub-pixel areas one by one;
    the reflection matrix comprises a plurality of light reflecting elements which correspond to the sub-pixel areas one by one;
    the light absorption structure layer comprises a plurality of light absorption elements which correspond to the sub-pixel areas one by one;
    the light extracting openings, the light blocking elements, the light reflecting elements and the light absorption elements are all positioned in the corresponding sub-pixel areas.

3. The display panel of claim 2, wherein the light blocking element comprises: a first light blocking pattern and a second light blocking pattern;
    the second light blocking pattern is located on a side, proximal to the light adjusting structure, of the first light blocking pattern, a surface, away from the first light blocking pattern, of the second light blocking pattern is a first inclined surface, a plane where the first inclined surface is located is intersected with a plane where the first light blocking pattern is located, and the first inclined surface faces the light extracting opening located in the sub-pixel area where the light blocking element is located.

4. The display panel of claim 3, wherein in each of the sub-pixel areas, the light reflecting element is farther from the light extracting opening than the second light blocking pattern;
    an orthographic projection of the second light blocking pattern on the plane where the first light blocking pattern is located is in contact with an orthographic projection of the light reflecting element on the plane where the first light blocking pattern is located.

5. The display panel of claim 3, wherein in each of the sub-pixel areas, the light reflecting element is positioned at a side of the first light blocking pattern proximal to the light adjusting structure;
    the light reflecting element and the second light blocking pattern are arranged on a surface, proximal to the light adjusting structure, of the first light blocking pattern side by side and are in contact with each other.

6. The display panel of claim 5, wherein the light reflecting element comprises: a body and a reflective layer, a surface, away from the first light blocking pattern, of the body is a second inclined surface, a plane where the second inclined surface is located is intersected with the plane where the first light blocking pattern is located, the second inclined surface faces the light extracting opening located in the sub-pixel area where the light reflecting element is located, and the reflective layer is arranged on the second inclined surface.

7. The display panel of claim 6, wherein the body, the first light blocking pattern, and the second light blocking pattern are integrally formed as a single piece.

8. The display panel of claim 1, wherein the light adjusting structure comprises a liquid crystal layer, the display structure layer further comprises a base substrate, a first electrode layer and a second electrode layer;
the first electrode layer is positioned on a side, proximal to the liquid crystal layer, of the base substrate, the black matrix and the reflection matrix are positioned on a side, proximal to the liquid crystal layer, of the first electrode layer, and the second electrode layer is positioned on a side, away from the black matrix, of the liquid crystal layer;
the light absorption structure layer is positioned between the second electrode layer and the liquid crystal layer.

9. The display panel of claim 1, wherein the display structure layer further comprises: a color filter matrix disposed on a side of the light adjusting structure away from the reflection matrix, and the color filter matrix is configured to filter light emitted from the preset position and/or to filter light reflected by a surface of the reflection matrix.

10. The display panel of claim 1, wherein a protective layer is disposed between the second electrode layer and the light absorption structure layer, and the protective layer is in contact with the light absorption structure layer, and the protective layer is configured to prevent material residue from occurring in a non-pattern area during a process of forming a pattern of the light absorption structure layer through a patterning process.

11. The display panel of claim 9, wherein a material of the light absorption structure layer comprises carbon; and
a material of the protective layer comprises silicon oxide.

12. The display panel of claim 1, wherein a scattering layer is provided on a side of the light guide structure layer away from the light adjusting structure.

13. The display panel of claim 1, wherein a side of the scattering layer away from the light guide structure layer is provided with a protective layer.

14. A display device, comprising: a collimated light source and the display panel as claimed in claim 1, wherein a light outlet of the collimated light source is arranged opposite to a light inlet of the light guide structure layer.

* * * * *